(12) United States Patent
Kawahara

(10) Patent No.: US 7,345,702 B2
(45) Date of Patent: Mar. 18, 2008

(54) IMAGE SENSING APPARATUS, CONTROL METHOD FOR ILLUMINATION DEVICE, FLASH PHOTOGRAPHING METHOD, AND COMPUTER PROGRAM PRODUCT

(75) Inventor: Hideo Kawahara, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 903 days.

(21) Appl. No.: 09/777,946

(22) Filed: Feb. 6, 2001

(65) Prior Publication Data

US 2001/0019364 A1  Sep. 6, 2001

(30) Foreign Application Priority Data

Feb. 7, 2000 (JP) ............................. 2000-029486

(51) Int. Cl.
*H04N 9/68* (2006.01)
(52) U.S. Cl. .................................... 348/234; 348/370
(58) Field of Classification Search ................. 348/234, 348/371, 364, 362, 335, 370; 382/168, 169, 382/170
See application file for complete search history.

(56) References Cited

U.S. PATENT DOCUMENTS

| | | | |
|---|---|---|---|
| 4,671,655 A | * | 6/1987 | Heard .......................... 356/227 |
| 4,705,382 A | * | 11/1987 | Mukai et al. ................. 396/111 |
| 4,985,725 A | * | 1/1991 | Serikawa ..................... 396/159 |
| 5,006,879 A | * | 4/1991 | Takagi et al. ................ 396/162 |
| 5,065,232 A | * | 11/1991 | Kondo ...................... 348/224.1 |
| 5,724,456 A | * | 3/1998 | Boyack et al. ............... 382/274 |
| 6,006,039 A | * | 12/1999 | Steinberg et al. .............. 396/57 |
| 6,151,073 A | * | 11/2000 | Steinberg et al. ............ 348/371 |

FOREIGN PATENT DOCUMENTS

| | | |
|---|---|---|
| JP | A55-135823 | 10/1980 |
| JP | A03-287239 | 12/1991 |
| JP | A04-331935 | 11/1992 |
| JP | 10-170993 | 6/1998 |
| JP | A11-355628 | 12/1999 |

OTHER PUBLICATIONS

Office Action dated Oct. 9, 2007, concerning the Japanese Patent Application No. 2001-027342 which claims domestic priority based on the basic Japanese Patent Application No. 2000-029486.

* cited by examiner

Primary Examiner—David Ometz
Assistant Examiner—Gary C Vieaux
(74) Attorney, Agent, or Firm—Morgan & Finnegan LLP

(57) ABSTRACT

It is an object of this invention to provide an apparatus which can properly expose a main object regardless of the background conditions. In order to achieve this object, there is provided an apparatus comprising a photometric unit for receiving object light and converting the object light into luminance signals of a plurality of areas, and a control unit for calculating the histogram of the luminance distribution on the basis of the luminance signals of the plurality of areas converted by the photometric unit, and controlling the operation of an illumination device for illuminating the object on the basis of the calculation result.

10 Claims, 18 Drawing Sheets

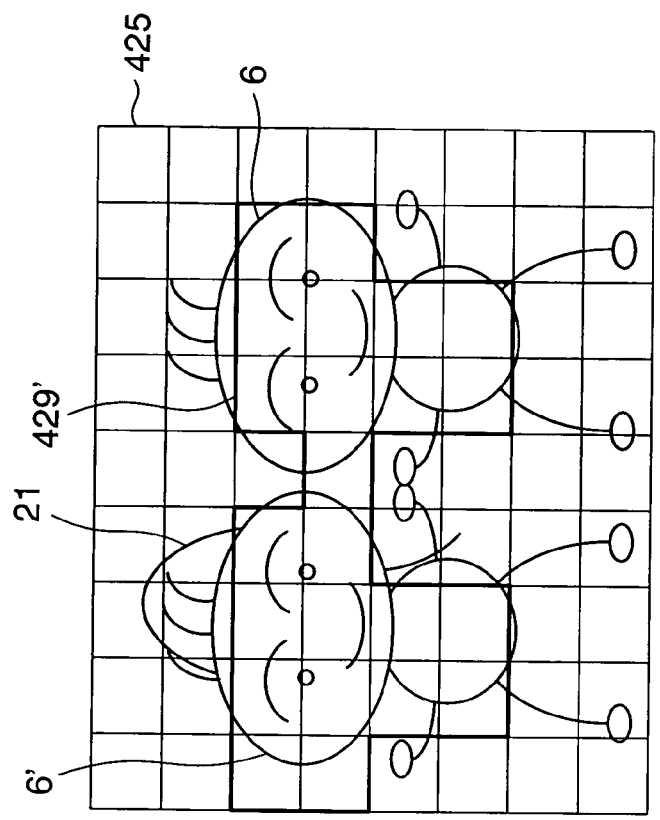
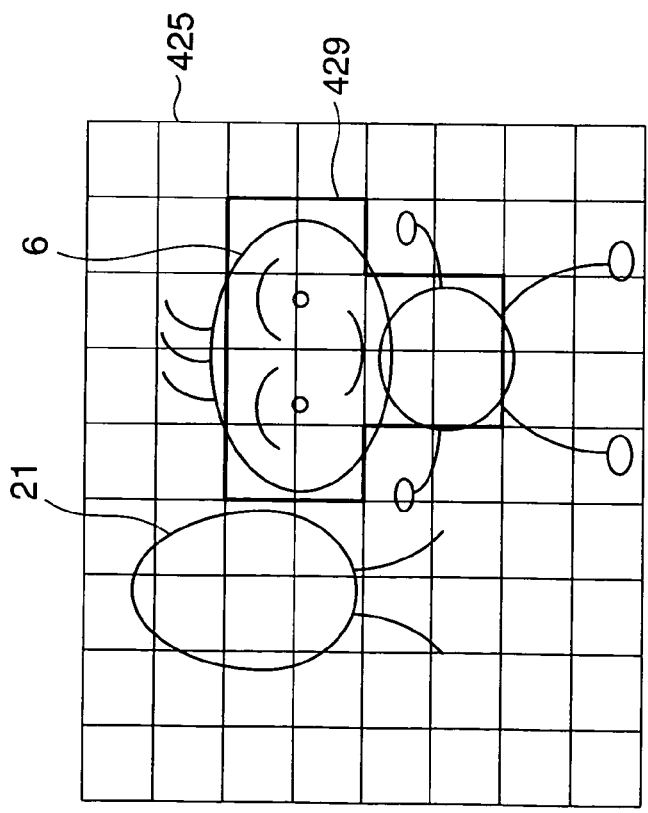
FIG. 12A
FIG. 12B

IMAGE SENSING APPARATUS, CONTROL METHOD FOR ILLUMINATION DEVICE, FLASH PHOTOGRAPHING METHOD, AND COMPUTER PROGRAM PRODUCT

FIELD OF THE INVENTION

The present invention relates to illumination control of a photographing object and flash photographing control.

BACKGROUND OF THE INVENTION

In conventional image sensing apparatuses, to obtain proper exposures, many brightness adjusting techniques of emitting auxiliary light to an object in advance and controlling, for example, the amount of auxiliary light emitted or the emission time have been proposed.

A typical brightness adjusting technique in a conventional image sensing apparatus will be described with reference to FIG. 2.

Referring to FIG. 2, reference numerals 150 and 152 denote imaging optical systems for forming an object image on an imaging plane.

Reference numeral 151 denotes a stop interposed between the imaging optical systems 150 and 152. This stop is generally disposed in an afocal (parallel light) range.

Reference numeral 161 denotes a photoelectric conversion element for converting the amount of light imaged into a quantity of electricity or charge. As this element, for example, an image sensing element such as a CCD (Charge-Coupled Device) is used.

Reference numeral 162 denotes a camera signal processing circuit for converting a sensed signal into, for example, a standard video signal on the basis of the quantity of electricity obtained from the photoelectric conversion element 161.

Reference numeral 13 denotes a recording device for recording the video signal having undergone signal processing in the camera signal processing circuit 162 as a photographing signal.

Reference numeral 1 denotes a detection means for generating a detection signal used for exposure control by performing detection processing such as integral processing for the luminance component of the video signal having undergone the signal processing in the camera signal processing circuit 162.

Reference numeral 2 denotes a predetermined reference value serving as a reference for exposure control, which is a voltage or charge generating means.

Reference numeral 3 denotes a comparing means for comparing the detection signal with the reference value 2 and outputting a signal corresponding to the comparison result.

Reference numeral 4 denotes a flash control means for controlling the amount of light emitted on the basis of the comparison result obtained by the comparing means 3.

Reference numeral 5 denotes a flash unit 5 for emitting auxiliary light; and 6, an object.

The operation of the above prior art will be described next with reference to the flow chart of FIG. 3.

The steps in this flow chart will be sequentially described below.

Step S1: This step is the beginning of the flow, which starts in synchronism with, for example, the operation of an imaging start switch.

Step S2: It is checked whether the flash unit 5 is completely charged. If the flash unit is not completely charged, the flow waits until charging is completed.

Step S3: Preliminary emission is performed in a predetermined light amount by using the flash unit 5.

Step S4: At the same time the flash unit 5 emits light, a sensed image is converted into a captured image signal.

Step S5: The detection means 1 is used to generate a detection signal used for exposure control from the sensed signal.

Step S6: The flash control means 4 determines an exposure level from the detection signal. If the exposure is proper, the flow advances to step S6. If an underexposure is determined, the flow advances to step S7. If an overexposure is determined, the flow advances to step S8.

Step S7: Preparation for emission is done in the same light amount as that in the preceding emission, and the flow advances to step S10.

Step S8: Preparation for emission is done by increasing the amount of light emitted in accordance with the preceding underexposure. The flow then advances to step S10.

Step S9: Preparation for emission is done by decreasing the amount of light emitted in accordance with the preceding overexposure. The flow then advances to step S10.

Step S10: It is checked whether the flash unit 5 is completely charted. If the flash unit 5 is not completely charged, the flow waits until changing is completed.

Step S11: At the same time the flash unit 5 emits light, a sensed image is converted into an image signal by the camera signal processing circuit 162, and the signal is recorded on the recording device 13.

Step S12: This flow is terminated.

With the above operations, proper exposure can be performed in photographing operation with emission of auxiliary light.

As described above, preliminary emission of the flash unit is performed in a predetermined light amount, and main emission is determined by the flash control means 4 on the basis of the level difference between the detection signal obtained in the preliminary emission and the reference value 2.

According to the arrangement of the conventional image sensing apparatus, however, exposure control is performed with reference to the detection output obtained upon preliminary emission of auxiliary light. According to this exposure adjustment, although it depends on the scheme used by the detection means and its characteristics, in the case of average light measurement which is a general detection technique using an integrator for averaging the overall brightness of a frame, if a main object occupies a high proportion of an imaging range, a proper exposure state can be obtained. In contrast to this, if the main object occupies a low proportion of the imaging range, or the background is located far away from the object or blackish, the above integral detection output is greatly influenced by the background, and a proper exposure state may not be obtained for the object.

Consider the object condition shown in FIG. 4. Referring to FIG. 4, reference numeral 6 denotes a main object to be photographed by a photographer; 21, a tree in the distant background; and 22, the photographing direction of the photographer. Assume that the object is in an illumination condition that requires auxiliary light.

FIGS. 5b to 5d show the images sensed by the image sensing apparatus in the object condition shown in FIG. 4.

FIGS. 5a and 5b show the sensed image of the object 6 as a single person, whereas FIGS. 5c and 5d indicate the sensed image of the object 6 including two persons exhibiting nearly equal reflectances and located at the same distance from the image sensing apparatus.

FIGS. 5b and 5d schematically show the degrees of illumination on the objects at the time of emission of the flash unit in brightness. As an object is located closer to the photographer (the image sensing apparatus including the flash unit), the object becomes brighter; reflected light from the tree 6 in the background or an object in the more distance background becomes very dark.

Consider an exposure level based on a comparison between the images shown in FIGS. 5b and 5d. Assuming that integral detection is performed by the detection means in the prior art described above, the detection output in FIG. 5b is smaller than that in FIG. 5d. This is because the main object in FIG. 5d at the short distance occupies a higher proportion of a detection area 25.

In controlling the main emission amount with reference to preliminary emission, therefore, although the object distances in FIGS. 5b and 5d are the same, since the detection output at the time of preliminary emission of auxiliary light in FIG. 5b becomes smaller than that in FIG. 5d, the emission amounts obtained from the above results at the time of main emission have the relationship represented by "amount in FIG. 5b>amount in FIG. 5d".

As described above, if a detection scheme like the above integral detection scheme is used, control is performed to set the sum total of luminance signals in the detection area 25 to a predetermined level. If, therefore, an object occupies a low proportion of the overall angle of view as shown in FIGS. 5a and 5b, and the background occupies a high proportion, since the output from the detection means based on integral detection becomes small, the flash control means 4 determines an underexposure and controls the amount of auxiliary light emitted. As a consequence, proper brightness control is not performed on the object, and an overexposure occurs.

In general, such a phenomenon is influenced by the position of an object, the brightness of a background, the proportion occupied by the object, and the like.

Note that the detection area 25 is a frame indicating the entire imaging area (detection area).

SUMMARY OF THE INVENTION

The present invention has therefore been made in consideration of the above problems, and has an object to properly illuminate or flash photograph a main object regardless of background conditions.

In order to solve the above problems and achieve the above object, an apparatus of the present invention, according to its first aspect, is characterized by having the following arrangement.

The apparatus comprises:
(A) a photometric unit for receiving object light and converting the object light into luminance signals of a plurality of areas; and
(B) a control unit for calculating a histogram of a luminance distribution on the basis of the luminance signals of the plurality of areas converted by the photometric unit, the control unit controlling operation of an illumination device for illuminating an object based on a result of the calculating.

An apparatus of the present invention, according to its second aspect, is characterized by having the following arrangement.

The apparatus comprises
(A) a photometric unit for receiving object light and converting the object light into luminance signals of a plurality of areas; and
(B) a control unit for calculating a histogram of a luminance distribution on the basis of the luminance signals of the plurality of areas converted by the photometric unit, the control unit controlling flash photographing operation based on a result of the calculating.

An illumination device control method according to the present invention is characterized being configured as follows.

The illumination device control method comprises:
receiving object light, converting the object light into luminance signals of a plurality of areas, calculating a histogram of a luminance distribution on the basis of the converted luminance signals of the plurality of areas, and controlling operation of an illumination device for illuminating an object based on a result of the calculating.

A flash photographing method according to the present invention is characterized by being configured as follows.

The flash photographing method comprises:
receiving object light, converting the object light into luminance signals of a plurality of areas, calculating a histogram of a luminance distribution on the basis of the converted luminance signals of the plurality of areas, and controlling flash photographing operation based on a result of the calculating.

A computer program product of the present invention, according to its first aspect, is characterized by being configured as follows.

The computer program product for supplying a control program for an illumination device comprises:
receiving object light, converting the object light into luminance signals of a plurality of areas, calculating a histogram of a luminance distribution on the basis of the converted luminance signals of the plurality of areas, and controlling operation of an illumination device for illuminating an object based on a result of the calculating.

A computer program product of the present invention, according to its second aspect, is characterized by being configured as follows:

The computer program product for supplying a flash photographing control program comprises:
receiving object light, converting the object light into luminance signals of a plurality of areas, calculating a histogram of a luminance distribution on the basis of the converted luminance signals of the plurality of areas, and controlling flash photographing operation based on a result of the calculating.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 12A and 12B are views showing how a frame is segmented;

DETAILED DESCRIPTION OF THE PREFERRED EMBODIMENTS

The preferred embodiments of the present invention will be described in detail below with reference to the accompanying drawings.

First Embodiment

Figure 1:
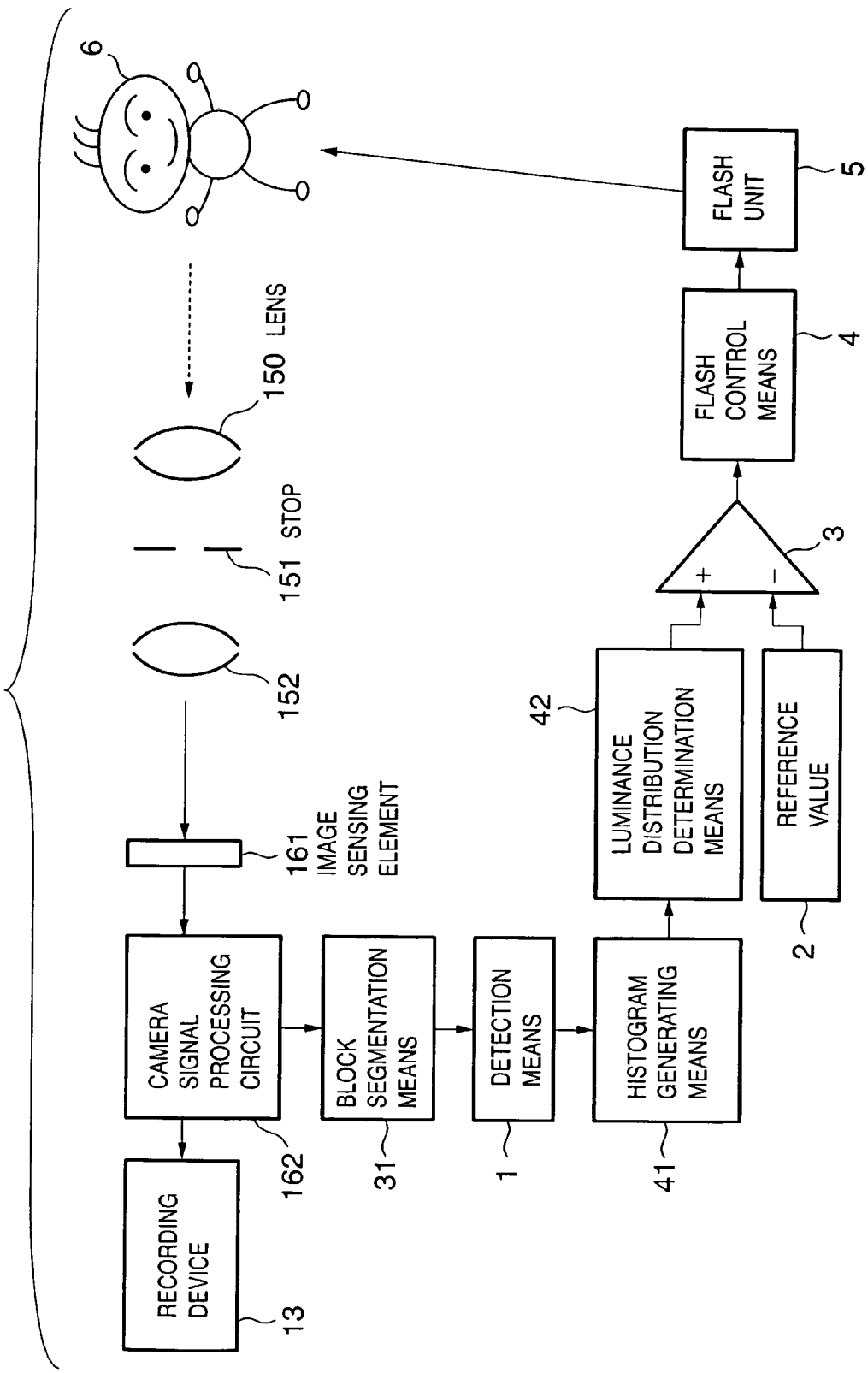
FIG. 1 is a block diagram showing an image sensing apparatus according to the first embodiment of the present invention.

FIG. 1 is a block diagram showing the arrangement of an image sensing apparatus according to the first embodiment of the present invention.

Figure 2:
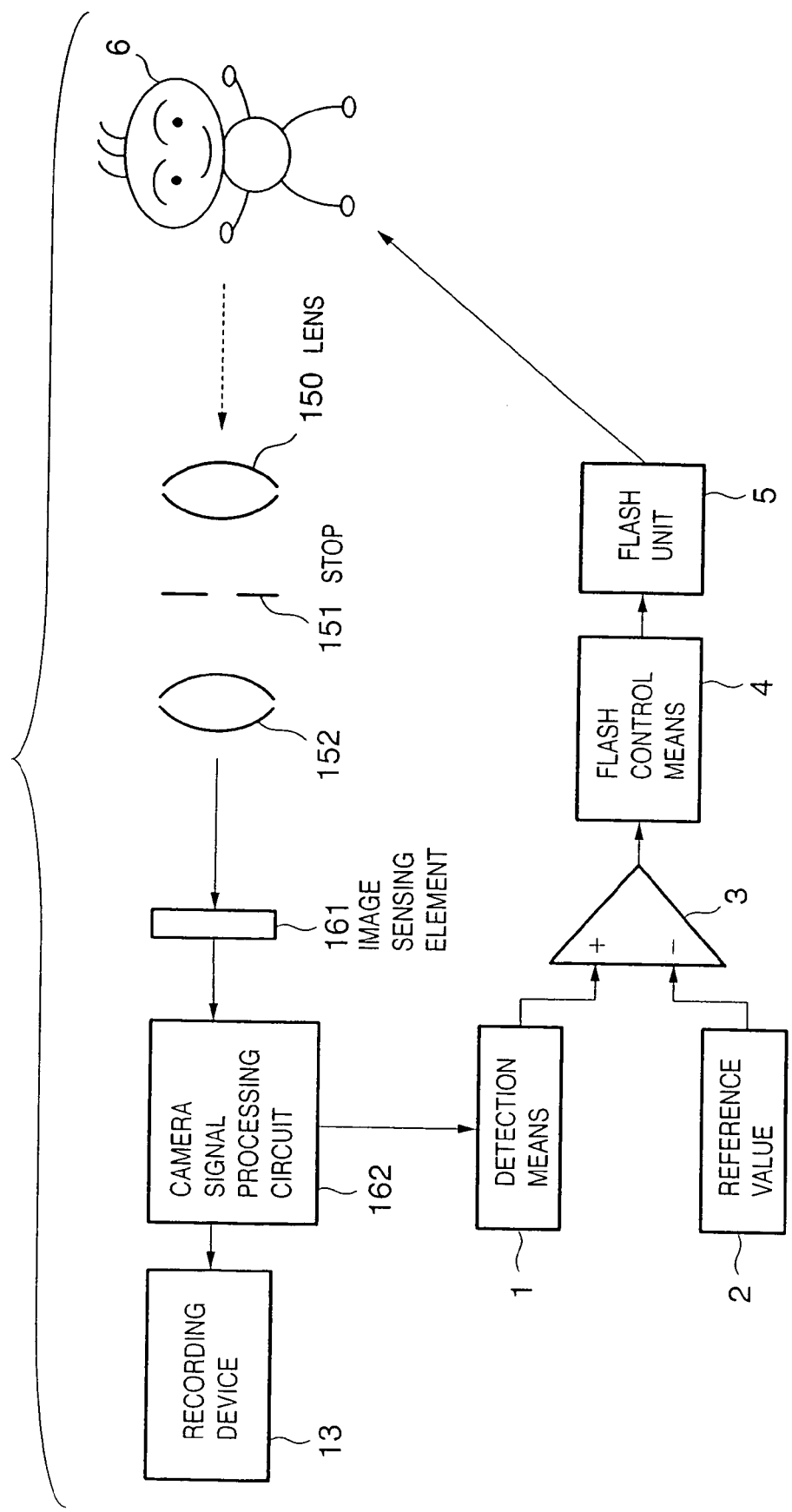
FIG. 2 is a block diagram showing a conventional image sensing apparatus.
Figure 3:
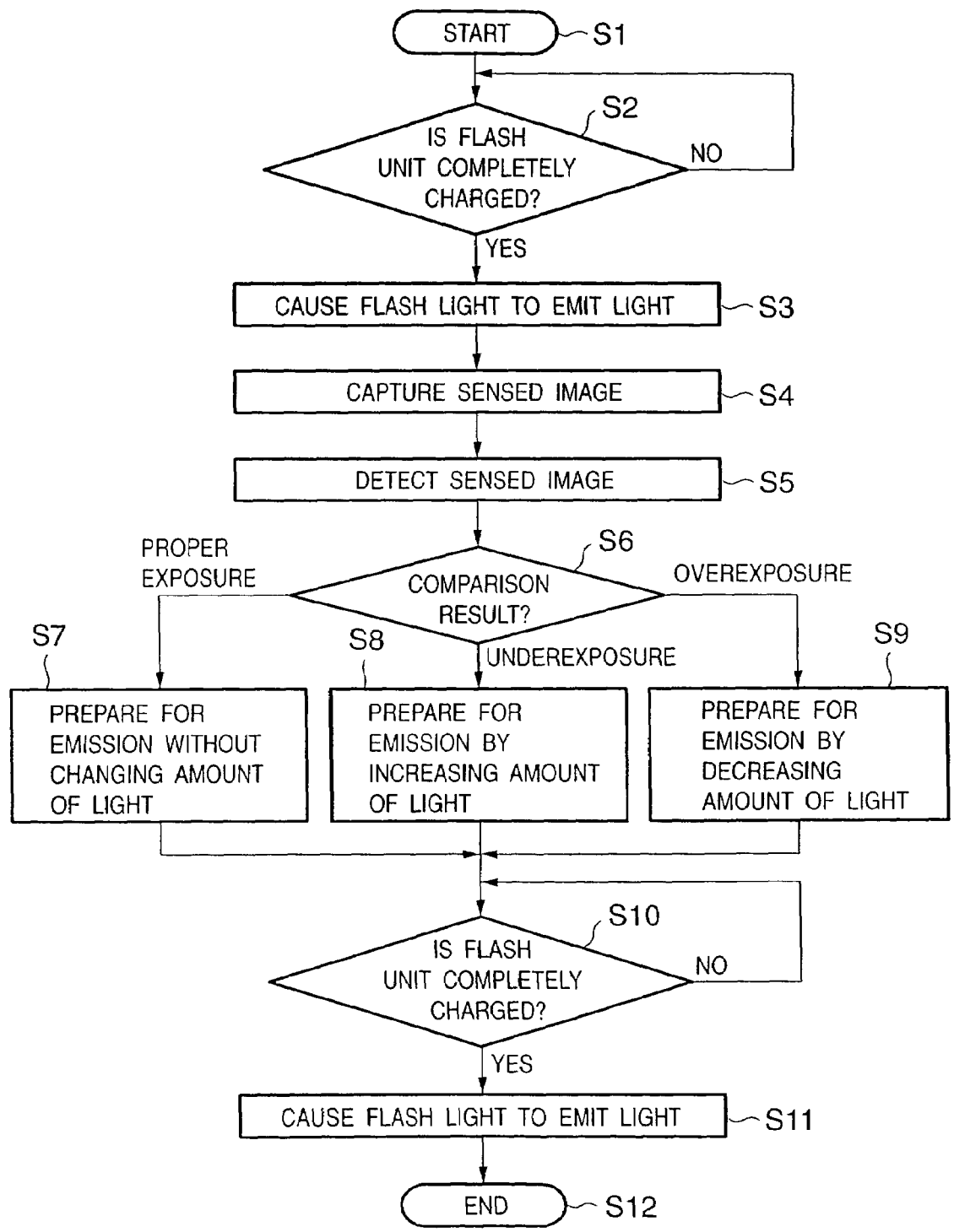
FIG. 3 is a flow chart for explaining the operation of the conventional image sensing apparatus.
Figure 4:
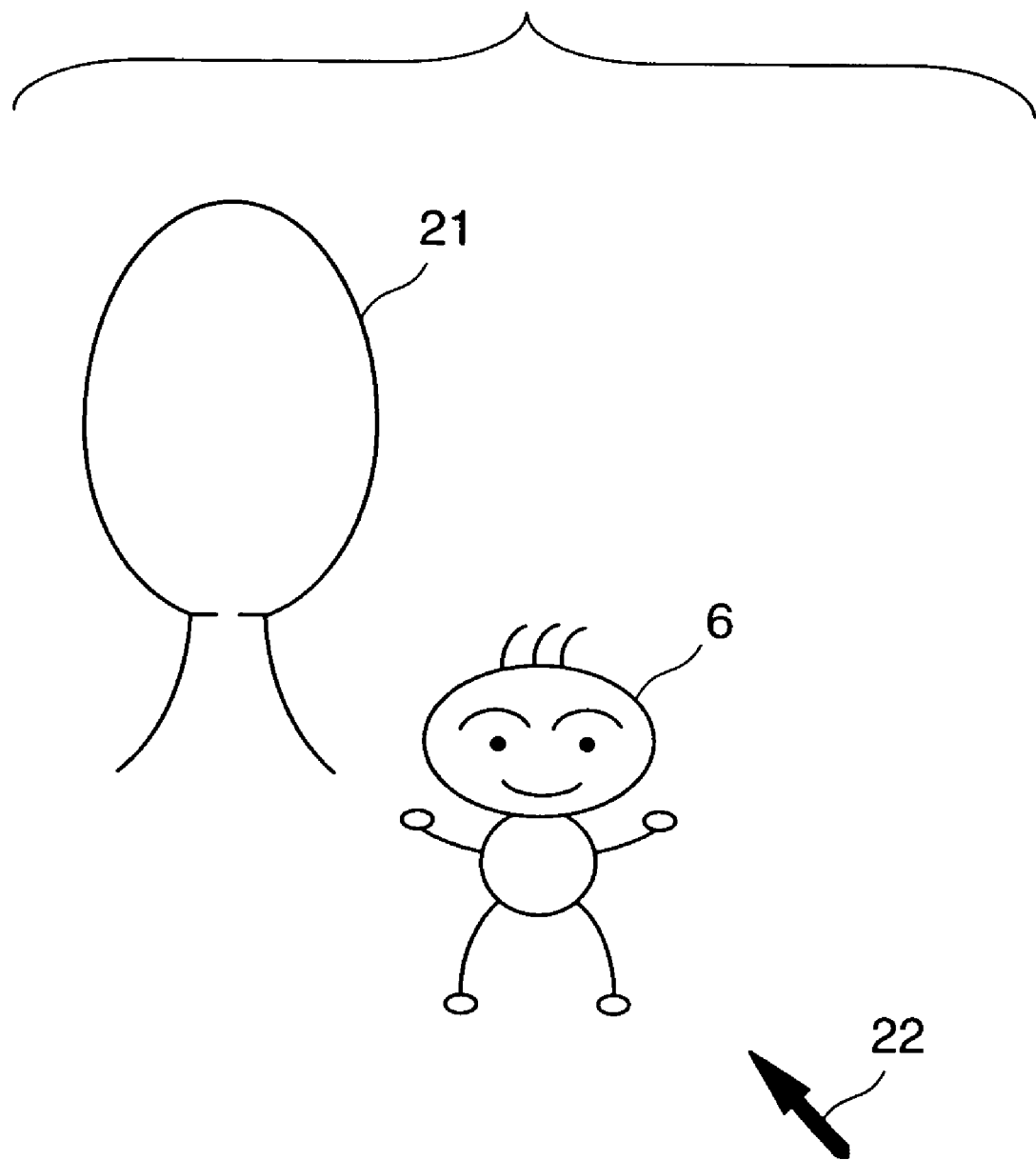
FIG. 4 is a view for explaining photographing conditions for an object.
Figure 5:
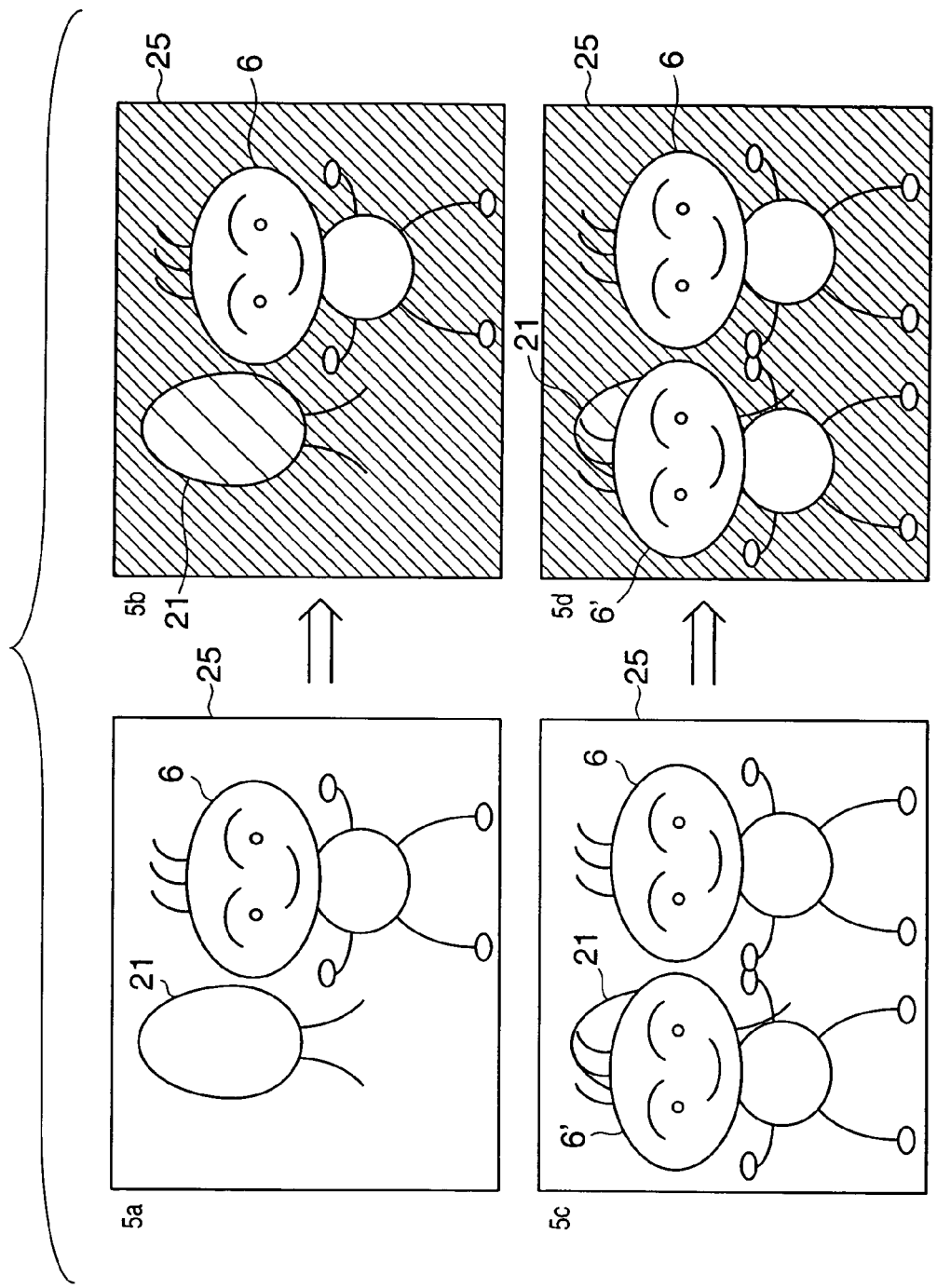
FIGS. 5a to 5d are views for explaining the photographing states of objects.

The same reference numerals as in FIG. 2 denote the same parts in FIG. 1, and a detailed description thereof will be omitted.

The arrangement of this embodiment differs from that of the prior art described above in that a block segmentation means 31, histogram generating means 41, and luminance distribution determination means 42 are added.

An object image formed on the imaging plane of an image sensing element 161 through imaging optical systems 150 and 152 and stop 151 is photoelectrically converted. The resultant signal is processed by a camera signal processing circuit 162. Of the video signal, the luminance signal is segmented into unit frames by the block segmentation means 31. This block segmentation is performed to divide the luminance signal into unit frames formed by a plurality of partitioned areas as shown in FIG. 6a.

A detection means 1 performs detection processing, e.g., integral processing, for each unit frame of the segmented luminance signal. The histogram generating means 41 then generates a histogram in accordance with the luminance levels obtained in units of blocks. The luminance distribution determination means 42 determines this histogram distribution and, more specifically, the magnitudes of histogram levels exhibiting low luminance levels.

In a photographing condition in which the distribution of low luminance levels is large, the background may occupy a large portion of the overall imaging angle of view and be located at a long distance. In other words, the main object occupies a small portion of the overall frame, and hence the proportion of blocks to which importance must be attached in determining an exposure is small.

If the proportion of low-luminance portions is high as in the above case, the luminance distribution determination means 42 invalidates this low luminance level information and obtains the sum total of the luminance levels of the remaining blocks as a detection signal for determining an exposure. A comparator 36 on the next stage then compares the sum total of luminance levels with a reference value 35 to determine the validity of the above amount of light emitted.

A flash control means 4 determines the amount of light emitted on the basis of input detection data as in the prior art, and controls the emission of a flash unit 5 in the determined amount of light emitted. For example, the flash control means 4 determines the amount of light emitted by determining a proper exposure, overexposure, or underexposure on the basis of the sum total of input detection data.

Histogram processing of the above luminance distribution will be described with reference to FIGS. 6a and 6b.

The frame denoted by reference numeral 25 in FIG. 6a is an overall sensed image. Reference numeral 6 denotes a main object. FIG. 6b shows how the portion in a circle 28 is enlarged, and a luminance histogram is formed. The rectangular blocks shown in FIG. 6b are formed such that the segmented frames are detected to assign a plurality of luminance levels to the respective frames, and numbers corresponding to the luminance levels are assigned to the respective frames. In this case, 11 luminance levels, from 0 to 10, are determined, and the respective frames are numbered accordingly. The number of blocks that can take the same value is counted in units of numbers representing the luminance levels in the overall frame, thus forming a histogram of a luminance distribution. FIG. 7A shows such a histogram. FIG. 7A shows the histogram of the luminance distribution under the object condition shown in FIGS. 6a and 6b. This histogram shows an extremely uneven distribution in which the number of blocks numbered "0" is the largest, and the number of blocks numbered "10" is the next largest. The number of blocks numbered "0" representing the lowest luminance is large because a distant background that auxiliary light cannot reach when it is emitted occupies a high proportion of the overall frame. In addition, the number of blocks numbered "10" representing the highest luminance is large because an object at a short distance, where the auxiliary light can easily reach, exists in the same frame.

In this case, the value "0" greatly deviates from a proper exposure on the dark side, whereas the value "10" greatly deviates from the proper exposure on the bright side. Assume that the luminance average of the overall frame is obtained as in the prior art. In this case, an exposure is determined from this average value, and a proper exposure or slight underexposure is determined. Considering exposure control for setting a proper exposure for the main object, an overexposure is set for the main object by the conventional technique.

Figure 7A:
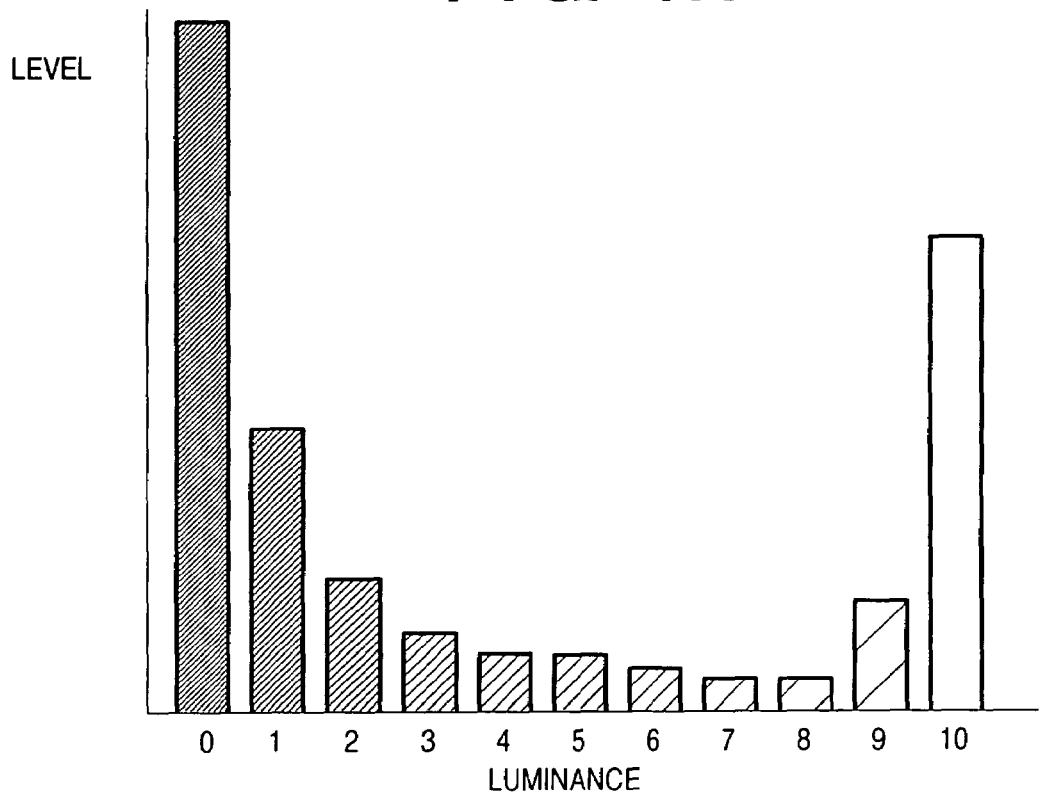
FIGS. 7A and 7B are graphs showing how histograms are calculated in the first embodiment.
Figure 7B:
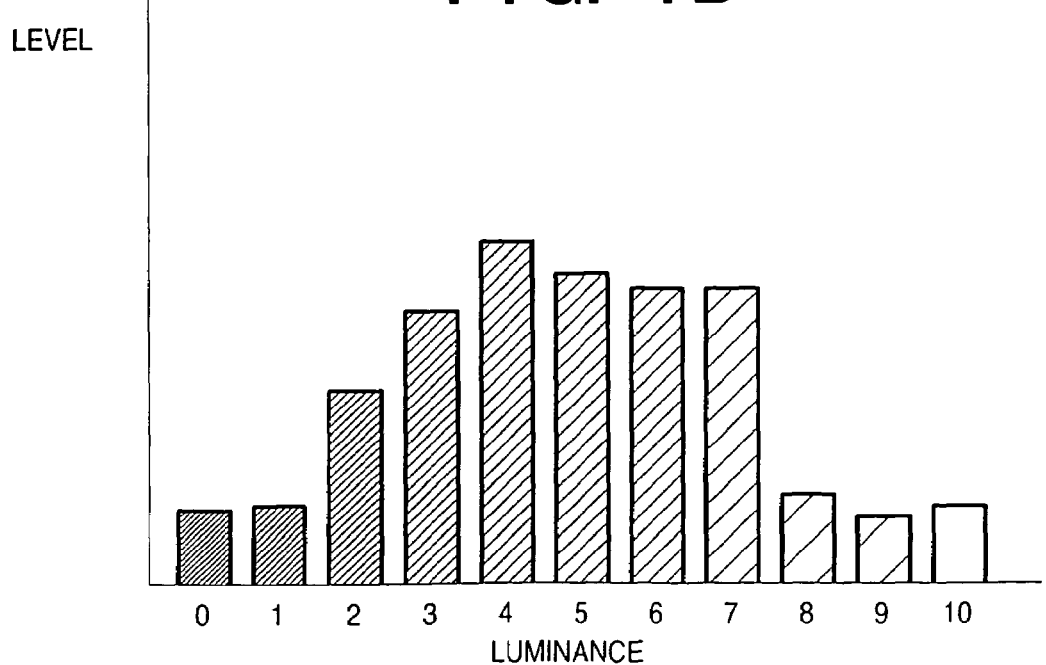

This is obvious from the fact that the average value of a luminance histogram distribution under an ideal object illumination condition like that shown in FIG. 7B is almost equal to that of the luminance histogram distribution shown in FIG. 7A described above.

In this embodiment, therefore, if it is determined on the basis of a histogram distribution that the proportion of low-luminance portions to the overall frame is high, an exposure level is calculated without adding the low-luminance-level components, thereby preparing for main emission to be performed next. An exposure state is therefore calculated, excluding the above low luminance level. That is, an exposure amount is calculated by using exposure levels excluding a distant object where auxiliary light cannot reach, thereby allowing exposure control with importance being attached to the main object.

Figure 8:
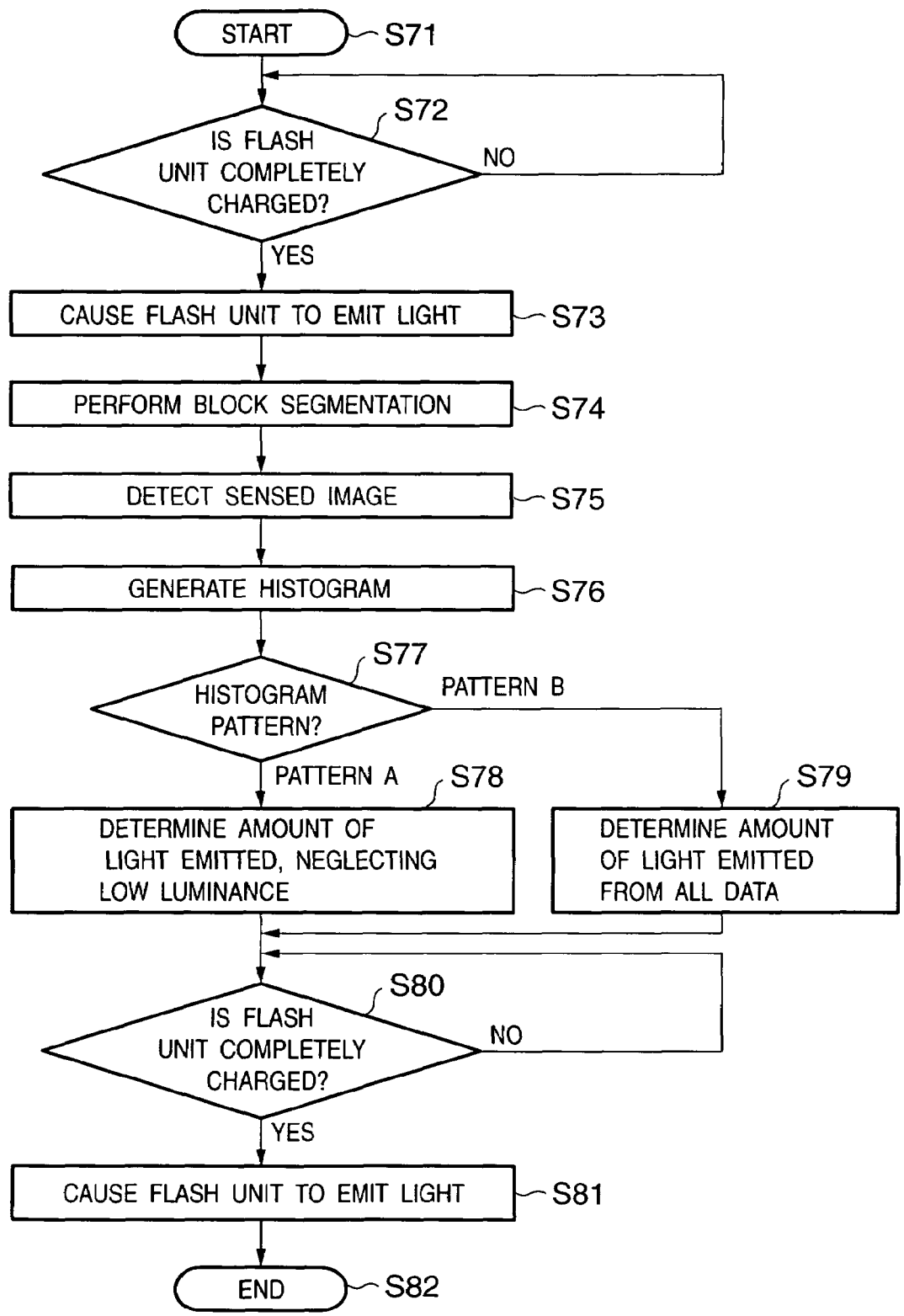
FIG. 8 is a flow chart for explaining the operation of an image sensing apparatus according to the first embodiment.

The above operation will be described with reference to the flow chart of FIG. 8.

The steps in this flow chart will be sequentially described below.

Step S71: This step is the beginning of the flow, which starts in synchronism with, for example, the operation of an imaging start switch.

Step S72: It is checked whether the flash unit 5 is completely charged. If the flash unit is not completely charged, the flow waits until charging is completed.

Step S73: At the same time the flash unit 5 auxiliary emits light, a sensed image is converted into an electrical image signal.

Step S74: The sensed image signal is segmented into blocks.

Step S75: A detection signal is generated from each sensed signal segmented as a block which is a unit frame.

Step S76: A histogram is generated from the detection data obtained in units of blocks.

Step S77: A histogram pattern is determined.

More specifically, it is checked on the basis of the proportion of low-luminance-level blocks whether the proportion of a distant object to the imaging frame exceeds a predetermined reference value (pattern A) or not (pattern B).

Step S78: If the low-luminance-level histogram components exceed a predetermined amount, the amount of light emitted from the flash unit 5 is determined, excluding the low-luminance-level blocks (e.g., the blocks numbered "0").

Step S79: If the low-luminance-level histogram components are equal to or less than the predetermined amount, the amount of light emitted from the flash unit 5 is determined, including all the blocks.

Step S80: It is checked whether the flash unit 5 is completely charged. If the flash unit is not completely charged, the flow waits until charging is completed.

Step S81: At the same time the flash unit 5 emits light, a sensed image is converted into an image signal.

Step S82: This flow is terminated.

With this above operation, in photographing operation with the emission of auxiliary light, a proper exposure can be achieved regardless of the positions of objects, the brightness of the background, the proportion of the main object, and the like.

Note that a frame may be segmented into blocks in minimum or larger pixel units of the image sensing elements. In general, as the frame is segmented in smaller units, control can be performed with higher precision. In addition, for the sake of descriptive convenience, a histogram is formed on the basis of 11 levels, from 0 to 10. However, the number of levels can also be increased.

Second Embodiment

Figure 9:
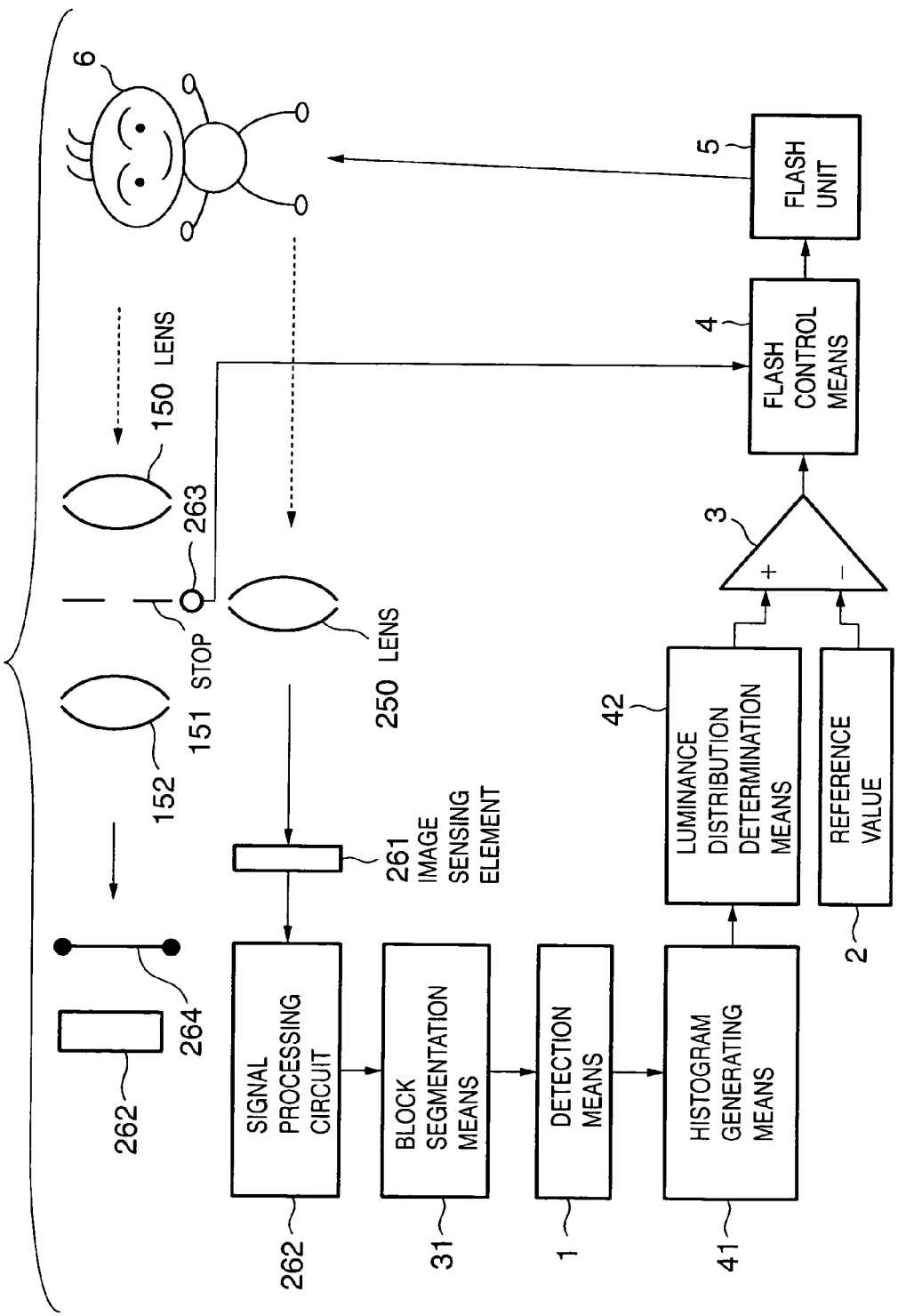
FIG. 9 is a block diagram showing an image sensing apparatus according to the second embodiment.

FIG. 9 is a block diagram showing the arrangement of an image sensing apparatus according to the second embodiment of the present invention.

The same reference numerals as in the prior art and the first embodiment denote the same parts in FIG. 9, and a detailed description thereof will be omitted.

The first embodiment is based on a so-called TTL exposure control scheme in which a common optical system is used for the imaging lens and exposure control. In the second embodiment, however, a scheme using different optical systems for an imaging optical system and exposure control will be described.

Referring to FIG. 9, reference numerals 150 and 152 denote imaging optical systems dedicated to image sensing operation and serve to form an object image on an imaging plane.

Reference numeral 151 denotes a stop interposed between the imaging optical systems 150 and 152. This stop is generally disposed in an afocal (parallel light) range.

Reference numeral 262 denotes a photoelectric conversion element for converting the amount of light imaged into an electrical (or charge) quantity, or an element whose physical properties are changed by light, e.g., a silver halide film containing a sensitizer.

Reference numeral 264 denotes a shutter curtain having a mechanism of opening/closing for a predetermined period of time in imaging operation. Although not shown, assume that an opening/closing mechanism for the shutter curtain 264 is also provided, which operates in synchronism with the operation of the shutter button.

Reference numeral 263 denotes a stop encoder for detecting and outputting the current aperture value.

In this embodiment, as in the first embodiment, a block segmentation means 31 segments the luminance signal of a video signal into unit frames, a detection means 1 performs detection processing such as integral processing, and a histogram generating means 41 generates a histogram in accordance with the luminance levels obtained in units of unit blocks. A luminance distribution determination means 42 determines the magnitude of histogram levels as low luminance levels in this histogram distribution, and obtains a detection signal by using only the data of luminance blocks determined as valid blocks. A comparator 36 compares the sum total of luminance levels with a reference value 35 to determine the excess/shortage of the amount of light emitted.

A characteristic feature of the second embodiment is that a flash control means 4 determines the amount of light emitted on the basis of the amount by which the stop 151 disposed in the imaging optical system is stopped down, as well as the excess/shortage of the amount of light emitted, and a flash unit 5 emits light in the obtained amount.

Figure 10A:
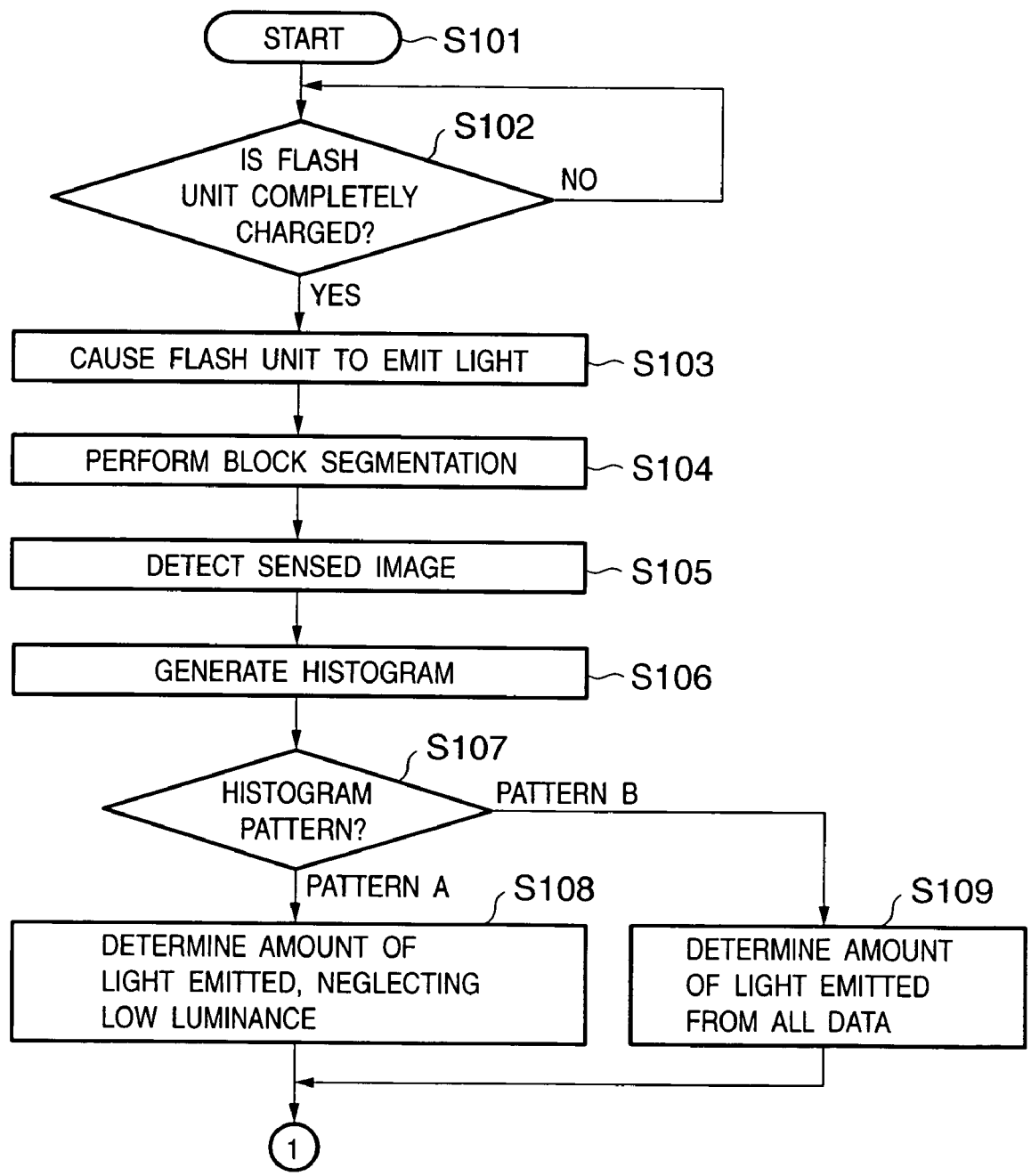
FIG. 10A is a flow chart for explaining the operation of the image sensing apparatus according to the second embodiment.
Figure 10B:
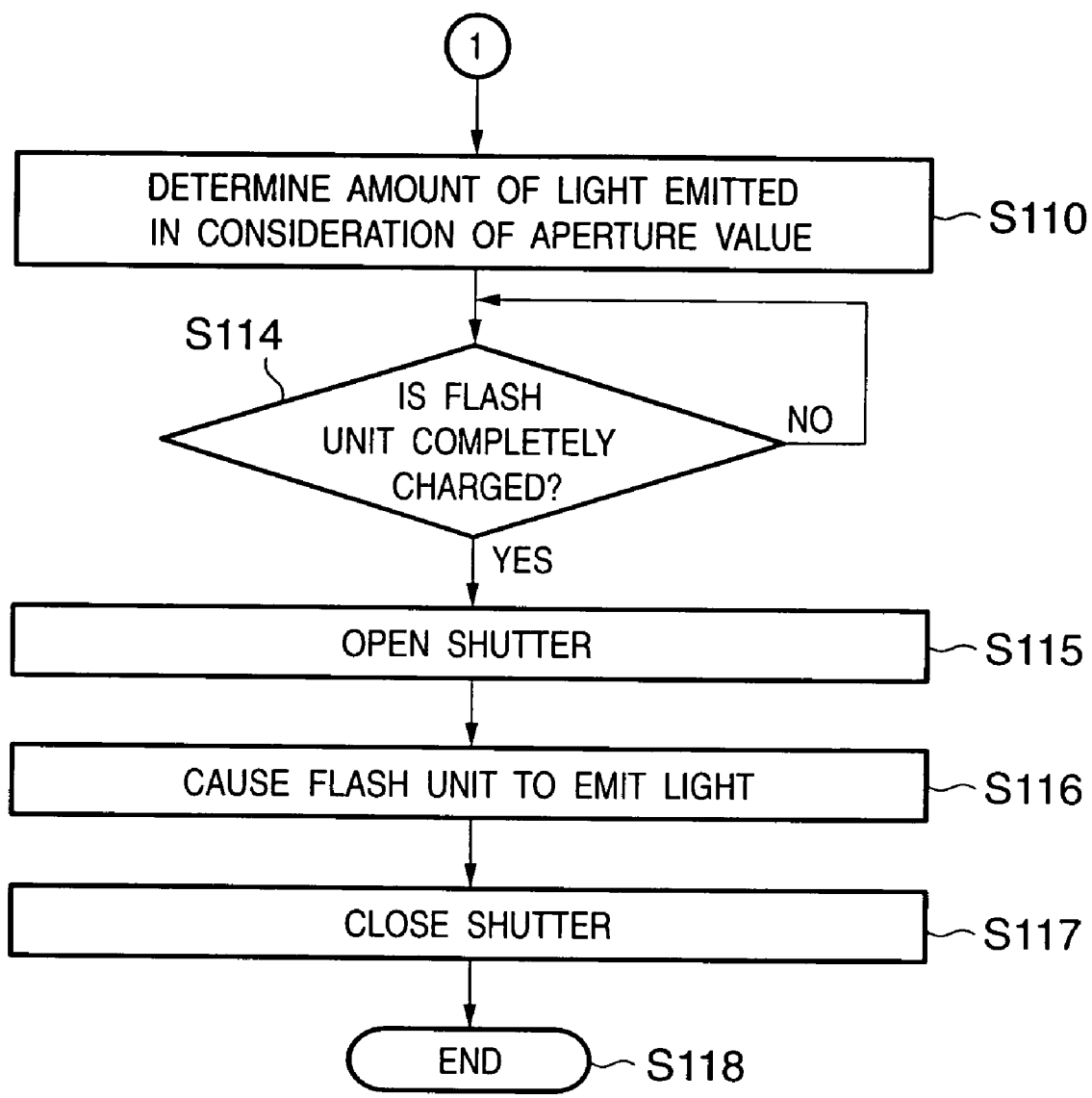
FIG. 10B is a flow chart for explaining the operation of the image sensing apparatus according to the second embodiment.

These operations will be described with reference to FIGS. 10A and 10B.

The steps in the flow charts will be sequentially described below.

Step S101: This step is the beginning of the flow, which starts in synchronism with, for example, the operation of an imaging start switch.

Step S102: It is checked whether the flash unit 5 is completely charged. If the flash unit is not completely charged, the flow waits until charging is completed.

Step S103: At the same time auxiliary emission of the flash unit 5 is performed, a sensed image is converted into an electrical image signal.

Step S104: The sensed image signal is captured, and the image is segmented into blocks.

Step S105: A detection signal is generated from each sensed signal segmented as a block.

Step S106: A histogram is generated from the detection data obtained in units of blocks.

Step S107: A histogram pattern is determined.

More specifically, it is checked on the basis of the proportion of low-luminance-level blocks whether the proportion of a distant object to the imaging frame exceeds a predetermined reference value (pattern A) or not (pattern B).

Step S108: If the low-luminance-level histogram components exceed a predetermined amount, the amount of light emitted from the flash unit 5 is determined, excluding the low-luminance-level blocks (e.g., the blocks numbered "0").

Step S109: If the low-luminance-level histogram components are equal to or less than the predetermined amount, the amount of light emitted from the flash unit 5 is determined, including all the blocks.

In step S110: An exposure level is determined from the temporarily determined amount of light emitted and stop information, and the amount of light emitted from the flash unit 5 is finally determined.

In this case, the stop information is used to determine a proper exposure, overexposure, or underexposure with respect to the amount of object light passing through an optical system 250 without any stop in consideration of the amount of light passing through the imaging optical systems 150 and 152 including the stop 151.

In general, as the stop is stopped down in one level, the amount of light emitted is doubled.

Step S114: It is checked whether the flash unit 5 is completely charged. If the flash unit is not completely charged, the flow waits until charging is completed.

step S115: The shutter curtain 264 is opened to guide light to the photoelectric conversion element, silver halide film, or the like.

Step S116: At the same time the flash unit 5 emits light, a sensed image is converted into an image signal.

Step S117: The shutter curtain 264 is closed.

Step S118: This flow is terminated.

With the above operation, photographing with the emission of auxiliary light can be performed with a proper exposure.

Figure 6:
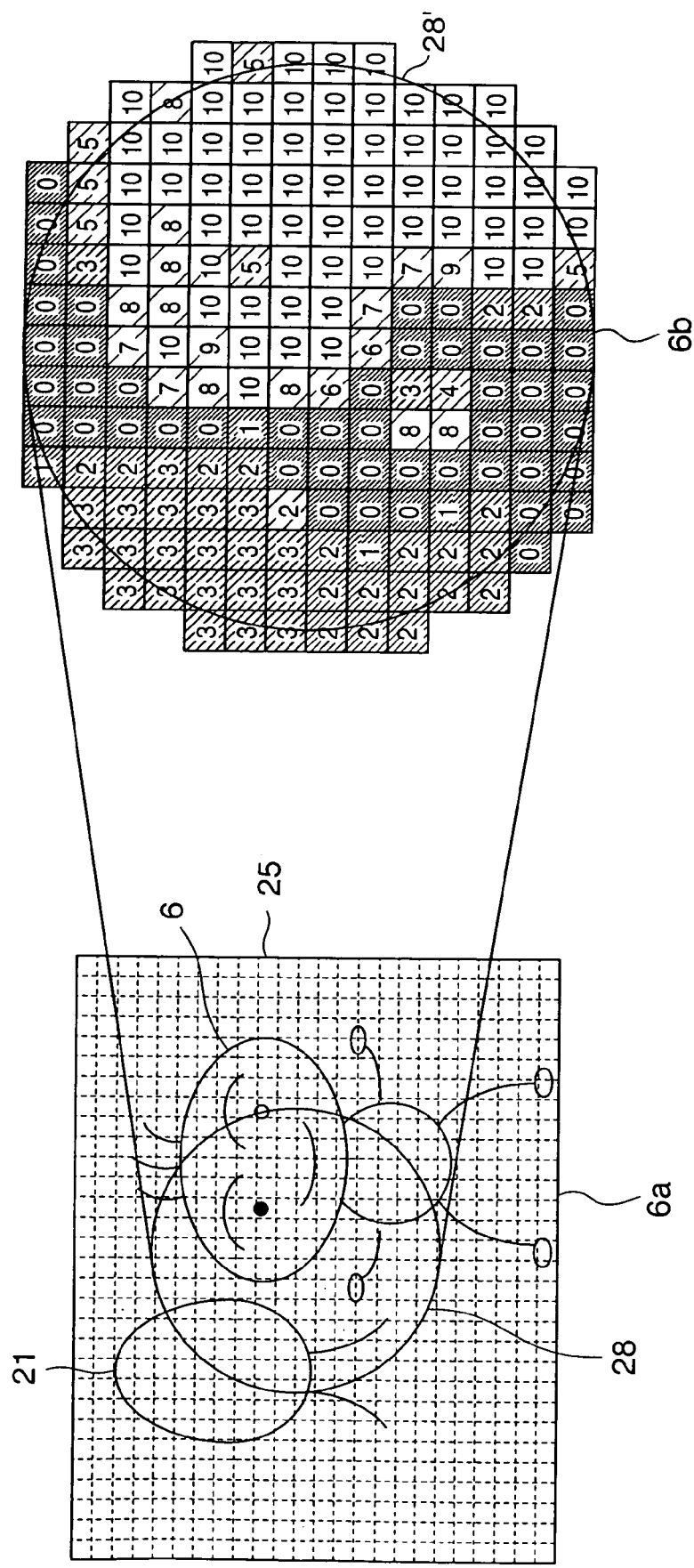
FIGS. 6a and 6b are block diagrams showing how block segmentation and detection are performed in the first embodiment.

The same condition as in FIG. 6 suffices for the segmentation of the sensed image. Only the blocks that are greatly influenced by changes in luminance upon emission of auxiliary light are used for actual exposure control.

In this description, the luminance levels of sensed signals are used for a histogram. However, for example, histograms may be generated from the signal levels of signals of three colors, i.e., red, blue, and green signals, obtained by color-separating a sensed signal, and the respective signal levels may be processed on the basis of the same principle as that of the luminance distribution determination means 42. Thereafter, the detection average of the signals of the three colors may be calculated to perform flash control.

Third Embodiment

Figure 11:
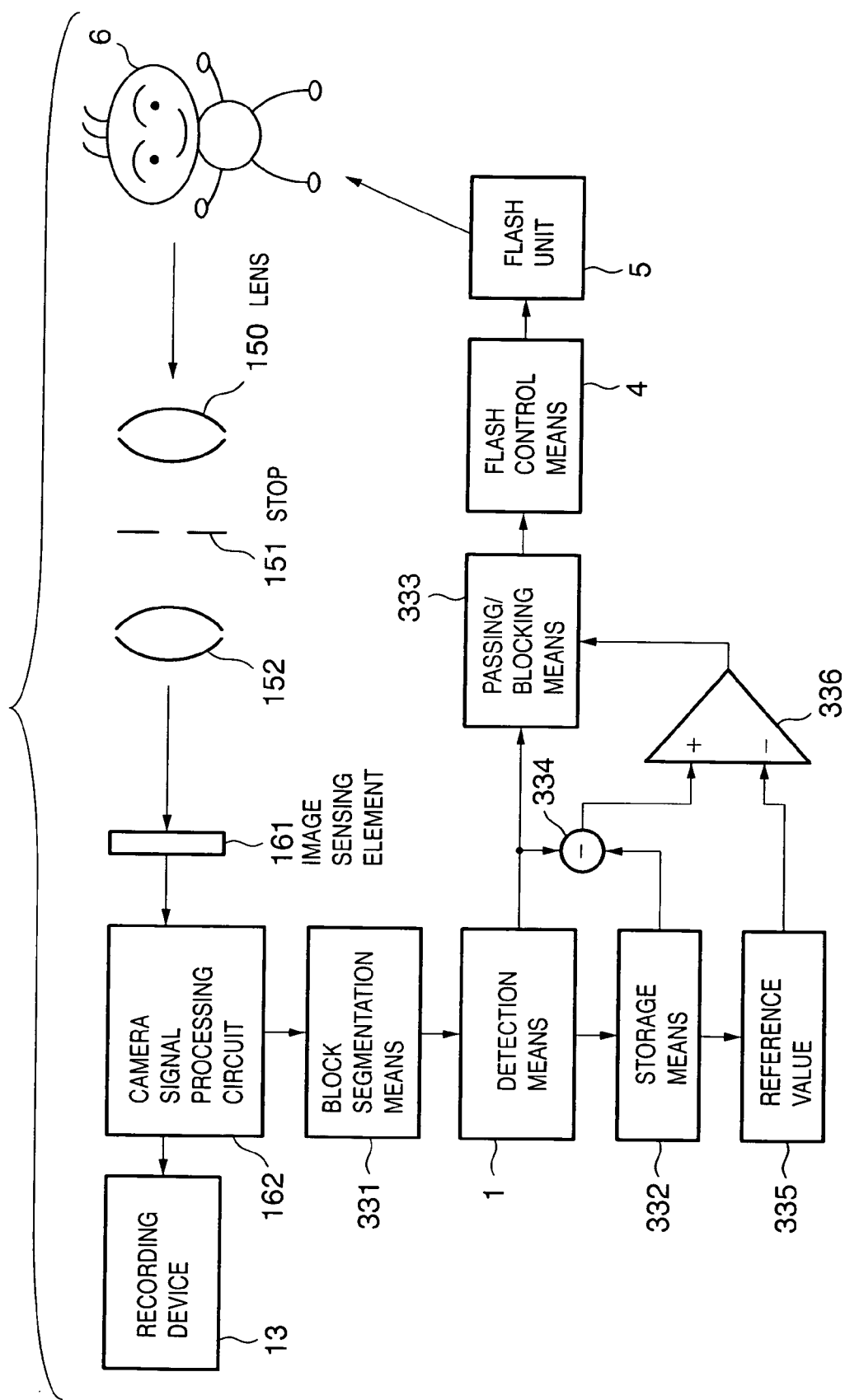
FIG. 11 is a block diagram showing an image sensing apparatus according to the third embodiment.

FIG. 11 is a block diagram showing the arrangement of an image sensing apparatus according to the third embodiment of the present invention.

The same reference numerals as in the prior art shown in FIG. 2 denote the same parts in FIG. 11, and a detailed description thereof will be omitted.

The arrangement of this embodiment differs from that of the prior art in that a block segmentation means 331, storage means 332, and passing/blocking means 333 are added.

The following processing is performed before a flash unit 5 is caused to emit light. An object image formed on the imaging plane of an image sensing element 161 through an imaging optical systems 150 and 152 and stop 151 is photoelectrically converted. The resultant signal is subjected to signal processing in a camera signal processing circuit 162. The block segmentation means 331 segments the luminance signal of the video signal into unit frames. A detection means 1 performs detection processing such as integral processing for the respective unit frames of the segmented luminance signals. The detection signals output from the detection means 1 are stored in the storage means 332 in units of blocks. This block segmentation is performed such that the frame is segmented into unit frames formed by, for example, 8×6 areas.

The following processing is performed after an image is captured at the same time the flash unit 5 emits light. The luminance signal component of the sensed image obtained upon preliminary emission of the flash unit 5 is input to the block segmentation means 331 to be segmented into unit frames as in the above case. The detection means 1 performs detection processing, e.g., integral processing described in the prior art, for the respective unit frames.

A subtraction circuit 334 performs subtraction processing for the detection value in each block as each unit frame at the time of preliminary emission of auxiliary light and the detection value in a corresponding block without emission of auxiliary light. A comparator 336 then compares the calculation result with a predetermined reference value 335.

If the difference output based on a given block as a unit frame takes a value larger than the reference value 335, it is determined that the detection data of the block is valid, and the data is input to a flash control means 4 through the passing/blocking means 333. In contrast to this, if the output takes a value smaller than the reference value 335, it is determined that the detection data of the block is invalid, and the data is blocked by the passing/blocking means 333 and is not input to the flash control means 4.

The flash control means 4 determines the amount of light emitted on the basis of the input detection data and controls the emission of the flash unit 5 in the determined amount as in the prior art. For example, the flash control means 4 determines the amount of light emitted by determining a proper exposure, overexposure, or underexposure on the basis of the sum total of the input detection data.

Figure 13A:
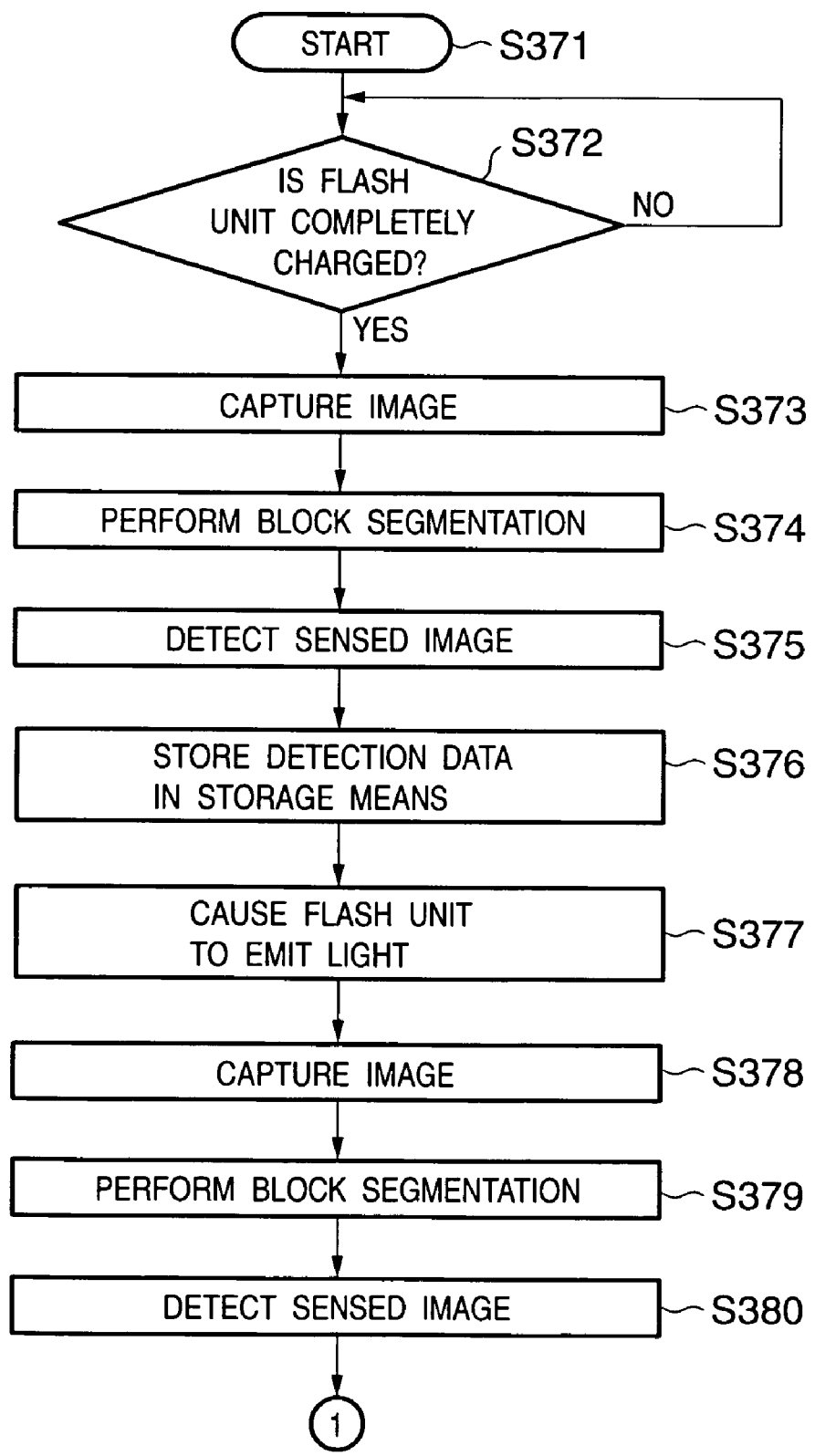
FIG. 13A is a flow chart for explaining the operation of the image sensing apparatus according to the third embodiment.
Figure 13B:
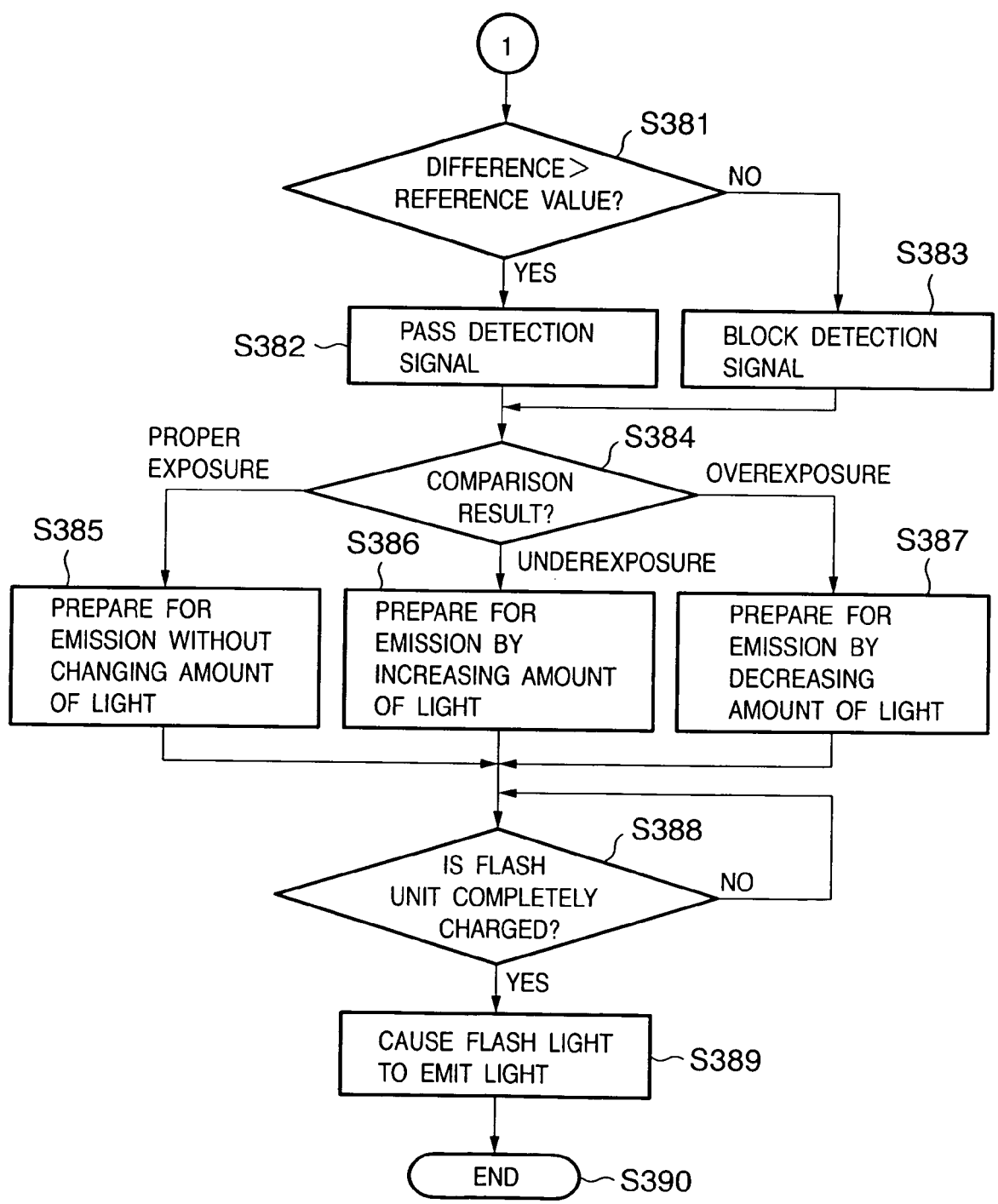
FIG. 13B is a flow chart for explaining the operation of the image sensing apparatus according to the third embodiment.

The above operation will be described with reference to the flow charts of FIGS. 13A and 13B.

The steps in the flow charts will be sequentially described below.

Step S371: This step is the beginning of the flow, which starts in synchronism with, for example, the operation of an imaging start switch.

Step S372: It is checked whether the flash unit 5 is completely charged. If the flash unit is not completely charged, the flow waits until charging is completed.

Step S373: A sensed image is captured and converted into an image signal (without emission of the flash unit).

Step S374: The sensed image signal is segmented into blocks.

Step S375: A detection signal is generated from each sensed image segmented as a block which is a unit frame.

Step S376: The detection data in the respective blocks are stored in the storage means.

Step S377: Preliminary emission of the flash unit is performed.

Step S378: A sensed image is captured and converted into an image signal.

Step S379: The sensed image is segmented into blocks as unit frames.

Step S380: A detection signal is generated from each sensed signal segmented as a block.

Step S381: The detection data stored in the storage means 332 is subtracted from each detection signal in units of blocks, and each result is compared with the reference value 335.

If the comparison result indicates calculation result >reference value, the flow advances to step S382. If the comparison result indicates calculation result≦reference value, the flow advances to step S383.

Step S382: It is determined that the data of the detected block is valid, and the data is passed through the passing/blocking means 333.

Step S383: It is determined that the data of detected block is invalid, and the data is blocked by the passing/blocking means 333.

Step S384: An exposure level is determined from the detection signal.

If a proper exposure is determined, the flow advances to step S385. If an underexposure is determined, the flow advances to step S386. If an overexposure is determined, the flow advances to step S387.

Step S385: Preparation for emission is done with the same light amount as in preliminary emission, and the flow advances to step S388.

Step S386: Preparation for emission is done by increasing the amount of light emitted by the shortage in preliminary emission, and the flow advances to step S388.

Step S387: Preparation for emission is done by decreasing the amount of light emitted by the excess in preliminary emission, and the flow advances to step S388.

Step S388: It is checked whether the flash unit 5 is completely charged. If the flash unit is not completely charged, the flow waits until charging is completed.

Step S389: At the same time the flash unit 5 emits light, a sensed image is converted into an image signal.

Step S390: This flow is terminated.

With the above operation, in photographing operation with the emission of auxiliary light, a proper exposure can be achieved regardless of the positions of objects, the brightness of the background, the proportion of the main object, and the like.

The segmentation of the sensed image in the above operation will be described next with reference to FIGS. 12A and 12B.

FIG. 12A shows a specific area of a sensed image which is selected under the same condition as that described with reference to FIGS. 5a to 5d. Referring to FIG. 12A, the 8×9 squares indicate blocks segmented as unit frames.

Only the blocks in a selection frame 429 indicated by the thick line are used as information for exposure control. Likewise, in the case shown in FIG. 12B, only the blocks in a selection frame 429' are used as information for exposure control.

In this range, the object is located closer to the photographer than the background, and hence flash light as auxiliary light can easily reach the object. As described in the above flow, the detection value of each unit frame stored in the storage means 332 is subtracted from the detection signal of a corresponding unit frame in units of blocks, and the subtraction result is compared with the reference value 335. As a consequence, only the blocks in which values indicating the degrees of influence on changes in luminance upon emission of auxiliary light are large (i.e., only the blocks in which the main object exists) are used for actual exposure control. This makes it possible to obtain a proper exposure regardless of the proportion of the main object at the short distance to the sensed image.

Fourth Embodiment

Figure 14:
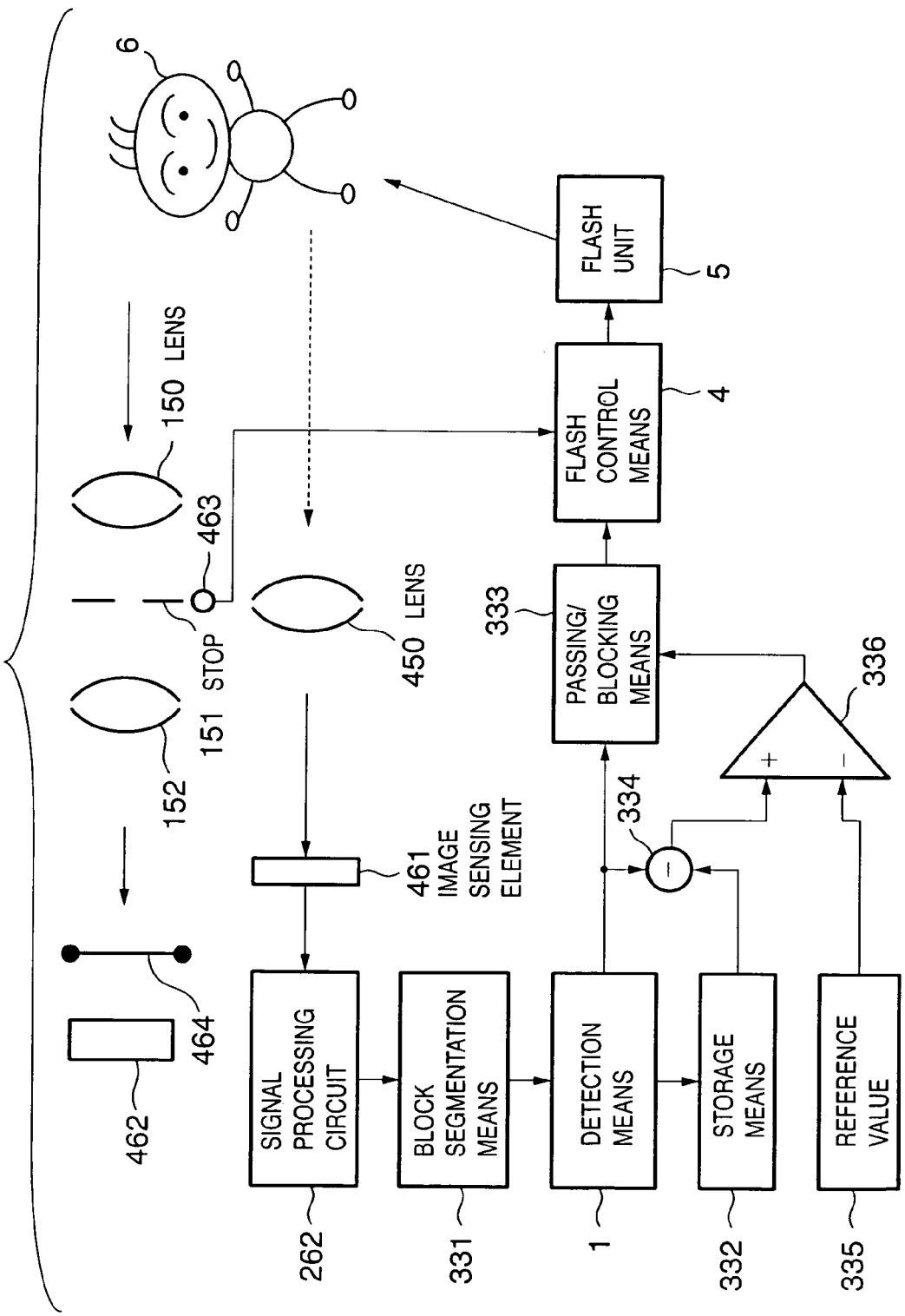
FIG. 14 is a block diagram showing an image sensing apparatus according to the fourth embodiment.

FIG. 14 is a block diagram showing the arrangement of an image sensing apparatus according to the fourth embodiment of the present invention.

The same reference numerals as in the prior art and third embodiment denote the same parts in FIG. 14, and a detailed description thereof will be omitted.

The third embodiment is based on the so-called TTL exposure control scheme in which a common optical system is used for the imaging lens and exposure control. In the fourth embodiment, however, a scheme using different optical systems for an imaging optical system and exposure control will be described.

Referring to FIG. 14, reference numerals 150 and 152 denote imaging optical systems dedicated to imaging operation, and serve to form an object image on the imaging plane.

Reference numeral 151 denotes a stop interposed between the imaging optical systems 150 and 152. This stop is generally disposed in an afocal (parallel light) range.

Reference numeral 462 denotes a photoelectric conversion element for converting the amount of light imaged into a quantity of electricity (or charge), or an element whose physical properties are changed by light, e.g., a silver halide film containing a sensitizer.

Reference numeral 464 denotes a shutter curtain having a mechanism of opening/closing for a predetermined period of time in imaging operation. Although not shown, assume that an opening/closing mechanism for the shutter curtain 464 is also provided, which operates in synchronism with the operation of the shutter button.

Reference numeral 463 denotes a stop encoder for detecting and outputting the current aperture value.

In this embodiment, as in the third embodiment, the following processing is performed before a flash unit 5 is caused to emit light. A signal processing circuit 262 performs signal processing for the electrical signal obtained by an image sensing element 461 by photoelectric conversion. A block segmentation means 331 breaks up the luminance component into unit frames. A detection means 1 performs detection processing such as integral processing for the respective segmented unit frames. The detection signals output from the detection means are stored in a storage means 332 in units of blocks.

Note that in this embodiment, the number of photoelectric conversion elements in the image sensing element 461 may be equal to the minimum number of blocks. For example, with the segmentation shown in FIG. 12, at least photoelectric conversion elements corresponding to 8×9 blocks will suffice.

The following processing is performed after the image is captured at the timing of emission of the flash unit 5. The luminance component of the sensed image obtained at the time of emission of the flash unit 5 is input to the block segmentation means 331 to be segmented into unit frames. The detection means 1 performs detection processing such as integral processing for the respective segmented unit frames.

A subtraction circuit 334 performs subtraction processing for the detection value of each block upon emission of auxiliary light and the detection value of a corresponding block without emission of auxiliary light. A comparator 336 then compares this calculation result with a predetermined reference value 335.

If the subtraction output takes a value larger than the predetermined reference value 335, it is determined that the detection data of the block is valid, and the data is input to a flash control means 4 through a passing/blocking means 333. In contrast to this, if the subtraction output takes a value smaller than the reference value 335, it is determined that the detection data of the block is invalid, and the data is blocked by the passing/blocking means 333 and is not input to the flash control means 4.

The flash control means 4 determines the amount of light emitted on the basis of the input detection data and the amount by which the stop 151 disposed in the imaging optical system is stopped down, and causes the flash unit 5 to emit light in the determined amount.

Figure 15A:
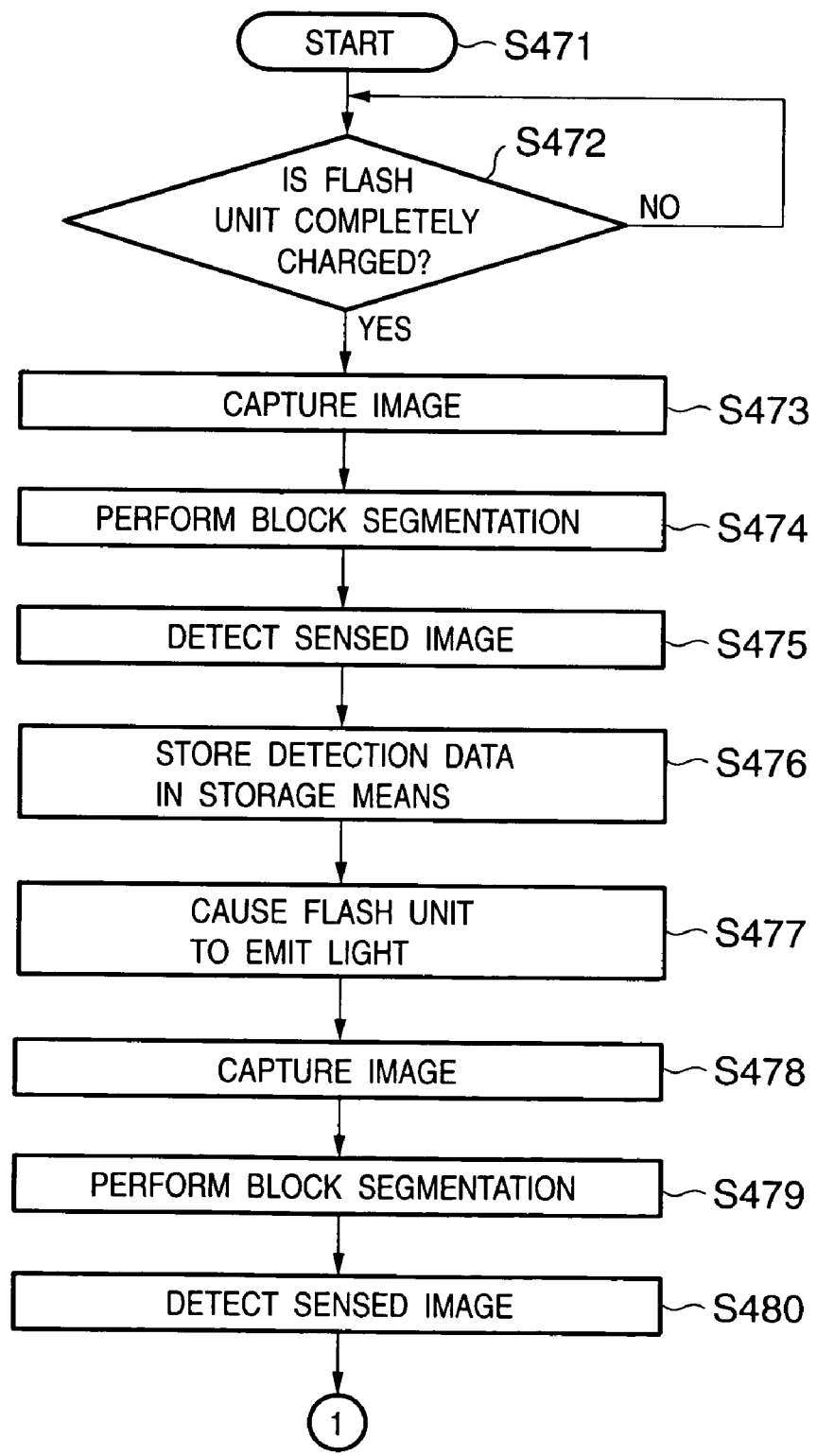
FIG. 15A is a flow chart for explaining the operation of the image sensing apparatus according to the fourth embodiment.
Figure 15B:
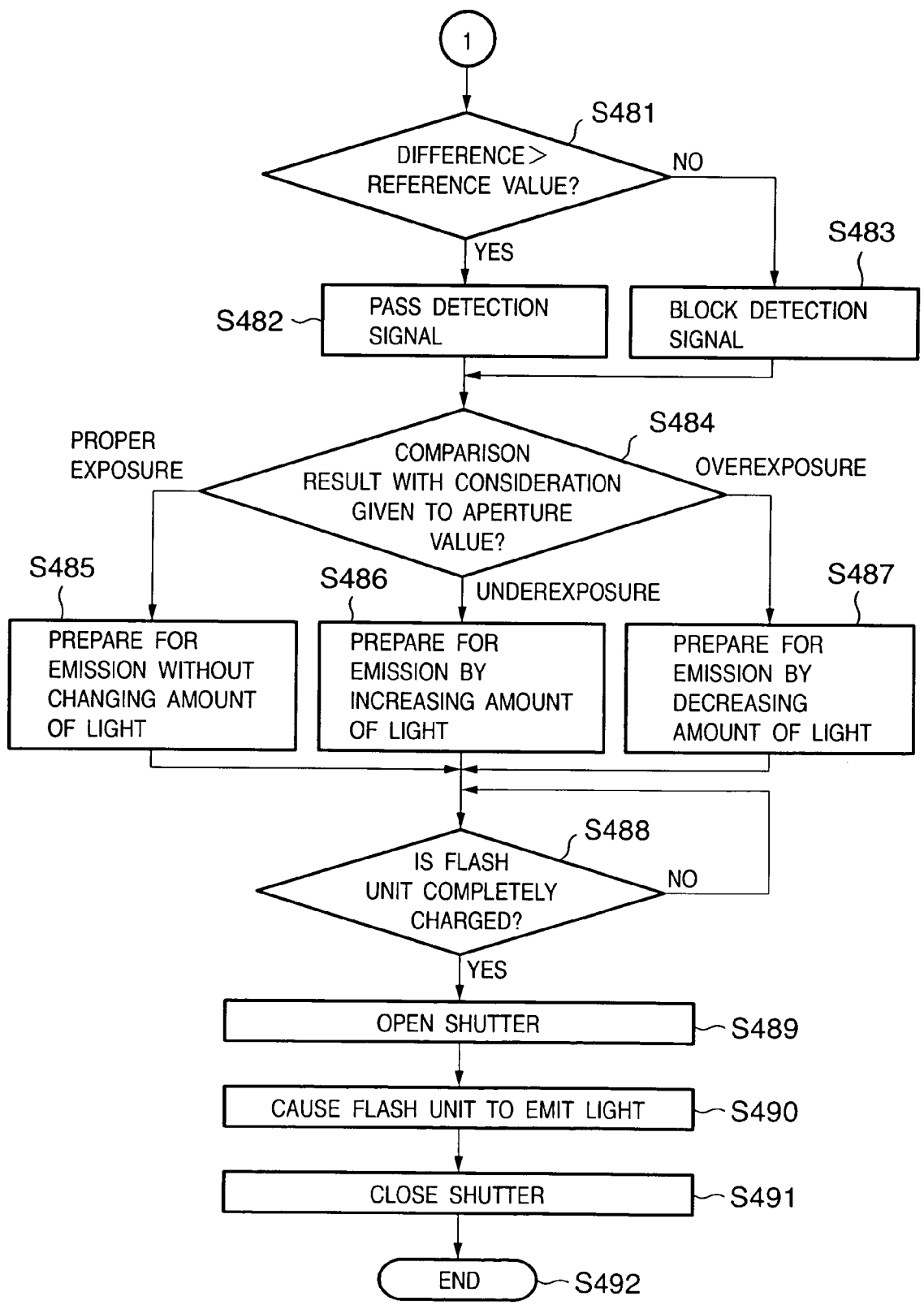
FIG. 15B is a flow chart for explaining the operation of the image sensing apparatus according to the fourth embodiment.

These operations will be described with reference to the flow charts of FIGS. 15A and 15B.

The steps in the flow charts will be sequentially described below.

step S471: This step is the beginning of the flow, which starts in synchronism with, for example, the operation of an imaging start switch.

Step S472: It is checked whether the flash unit 5 is completely charged. If the flash unit is not completely charged, the flow waits until charging is completed.

Step S473: A sensed image is captured and converted into an image signal (without emission of the flash unit).

Step S474: The sensed image signal is segmented into blocks.

Step S475: A detection signal is generated from each sensed signal segmented as a block.

Step S476: The detection data of each block is stored in the storage means 332.

Step S477: Preliminary emission of the flash unit is performed.

Step S478: The sensed image is captured and converted into an image signal.

Step S479: The sensed image is segmented into unit frames as blocks.

Step S480: A detection signal is generated from each sensed signal segmented as a block.

Step S481: The detection data stored in the storage means 332 is subtracted from detection signal, and the result is compared with the reference value 335.

If the comparison result indicates calculation result >reference value, the flow advances to step S482. If the comparison result indicates calculation result≦reference value, the flow advances to step S483.

Step S482: It is determined that the detected block data is valid, and the data is passed through the passing/blocking means 333.

Step S483: It is determined that the detected block data is invalid, and the data is blocked by the passing/blocking means 333.

Step S484: An exposure level is checked from the detection signal and stop information.

If the exposure is proper, the flow advances to step S485. If an underexposure is determined, the flow advances to step S486. If an overexposure is determined, the flow advances to step S487.

In this case, the stop information is used to determine a proper exposure, overexposure, or underexposure with respect to the amount of-object light passing through an optical system 450 without any stop in consideration of the amount of light passing through the imaging optical systems 150 and 152 including the stop 151.

Step S485: Preparation for emission is done in the same light amount as that in the preceding emission, and the flow advances to step S488.

Step S486: Preparation for emission is done by increasing the amount of light emitted in accordance with the preceding underexposure. The flow then advances to step S488.

Step S487: Preparation for emission is done by decreasing the amount of light emitted in accordance with the preceding overexposure. The flow then advances to step S488.

Step S488: It is checked whether the flash unit 5 is completely charted. If the flash unit 5 is not completely charged, the flow waits until changing is completed.

Step S489: The shutter curtain 464 is opened to guide light to the photoelectric conversion element, silver halide film, or the like.

Step S490: At the same time the flash unit 5 emits light, a sensed image is converted into and image signal.

Step S491: The shutter curtain 464 is closed.

Step S492: This flow is terminated.

With the above operations, proper exposure can be performed in photographing operation with emission of auxiliary light. The same condition as in FIG. 12 suffices for the segmentation of the sensed image. Only the blocks that are greatly influenced by changes in luminance upon emission of auxiliary light are used for actual exposure control.

Other Embodiments

The present invention can be applied to a system constituted by a plurality of devices (e.g., host computer, interface, reader, printer) or to an apparatus comprising a signal device (e.g., copying machine, facsimile machine).

Further, the object of the present invention can also be achieved by providing a storage medium (or recording medium) storing program codes for implementing the aforesaid function of the above embodiments to a system or apparatus, reading the program codes, by a computer(CPU or MPU) of the system or apparatus, from the storage medium, then executing the program. In this case, the program codes read from the storage medium realize the functions according to the embodiments, and storage medium storing the program codes constitutes the invention. Furthermore, besides aforesaid functions according to the above embodiment are realized by executing the program codes which are read by a computer, the present invention includes a case where an OS (operating system) or the like running on the computer performs a part or entire processes in accordance with designations of the program codes and realizes functions according to the above embodiments.

Furthermore, the present invention also includes a case where, after the program codes read form the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

When the present invention is to be applied to the above storage medium, program codes corresponding to the flow charts described above (shown in FIGS. 8, 10, 13, and 15) are stored in the storage medium.

As has been described above, according to the first and second embodiments, a sensed image obtained upon preliminary emission of auxiliary light is segmented into a plurality of blocks and detected. A histogram corresponding to the detection levels of the respective blocks is calculated, and valid detection blocks for flash control on auxiliary light are extracted on the basis of the histogram pattern of luminance levels, thereby adjusting the amount of light emitted in main emission.

A proper exposure can be attained regardless of the proportion of an object to the overall frame, the distance to the object, and the like.

According to the third and fourth embodiments, a sensed image is segmented into a plurality of blocks, and it is checked, on the basis of change levels of object luminances in each block at the time of emission of auxiliary light and at the time of no emission, whether the luminance information of each segmented block is used for exposure control, thereby performing exposure control. With this operation, a proper exposure can be achieved regardless of the proportion of an object to the overall frame, the distance to the object, and the like.

In each embodiment described above, the amount of light emitted from the flash unit (including the emission time) is controlled in accordance with luminance levels selected in accordance with the histogram of luminance levels. However, in addition to the amount of light emitted from the flash unit, other flash exposure factors such as the stop and shutter may be controlled.

In each embodiment described above, a predetermined low luminance level is excluded in accordance with the histogram of luminance levels. In addition, a predetermined high luminance level may be excluded as needed.

According to the present invention, flash photographing operation may be controlled by assigning different weights to the respective luminance levels instead of completely excluding a predetermined luminance level in accordance with the histogram of luminance levels.

In addition, according to the present invention, flash photographing operation may be controlled on the basis of a histogram from which a predetermined luminance level is excluded from the very beginning.

The software arrangements and hardware arrangements in the embodiments described above can be replaced, as needed.

In addition, the respective embodiments of the present invention or their technical elements may be combined with each other, as needed.

In the present invention, all or some of the constituent elements of each claim or embodiment may constitute one apparatus, combined with another apparatus, or become elements of an apparatus.

The present invention can be applied to various types of cameras such as electronic cameras for sensing moving images or still images, cameras using silver halide films, single-lens reflex cameras, lens shutter cameras, and monitoring cameras, other apparatuses such as image sensing apparatuses other than cameras, image readers, and optical apparatuses, apparatuses applied to the cameras, image sensing apparatuses, image readers, optical apparatuses, and other apparatuses, elements constituting these apparatuses, control methods for the apparatuses, and computer program products such as storage media for providing the control methods.

As has been described above, according to each embodiment described above, a main object can be properly exposed regardless of the condition of the background.

As many apparently widely different embodiments of the present invention can be made without departing from the spirit and scope thereof, it is to be understood that the invention is not limited to the specific embodiments thereof except as defined in the appended claims.

What is claimed is:

1. An apparatus comprising:
(A) a photometric unit for receiving object light and converting the object light into luminance signals of a plurality of areas of an image sensor;
(B) a control unit for calculating a histogram of a luminance distribution on the basis of the luminance signals of the plurality of areas of the image sensor converted by said photometric unit; and
(C) a luminance distribution determination unit for determining areas of the image sensor which are regarded as having a predetermined low-luminance-level in the histogram,
wherein said control unit controls a light emission of an illumination device based on a luminance signal excluding luminance signals of areas of the image sensor which are determined as to have the predetermined low-luminance-level by said luminance distribution determination unit, and whose proportion to overall frame exceeds a reference value.

2. The apparatus according to claim 1, wherein said apparatus includes an image sensing apparatus.

3. The apparatus according to claim 1, wherein the histogram is generated on the basis of signal levels of red signal, blue signal and green signal that are obtained by decomposing a sensed image signal.

4. An apparatus comprising:
(A) a photometric unit for receiving object light and converting the object light into luminance signals of a plurality of areas of an image sensor;
(B) a control unit for calculating a histogram of a luminance distribution on the basis of the luminance signals of areas of the image sensor converted by said photometric unit; and
(C) a luminance distribution determination unit for determining areas of the image sensor which are regarded as having a predetermined low-luminancelevel in the histogram,
wherein said control unit controls a light emission in a case of a flash photographing operation based on a luminance signal excluding luminance eignal signals of areas of the image sensor which are determined as to have the predetermined low-luminance-level by said luminance distribution determination unit, and whose proportion to overall frame exceeds a reference value.

5. The apparatus according to claim 4, wherein said apparatus includes an image sensing apparatus.

6. The apparatus according to claim 4, wherein the histogram is generated on the basis of signal levels of red signal, blue signal and green signal that are obtained by decomposing a sensed image signal.

7. An illumination device control method comprising:
a step of receiving object light;
a step of converting the object light into luminance signals of a plurality of areas of an image sensor;
a step of calculating a histogram of a luminance distribution on the basis of the converted luminance signals of the plurality of areas of the image sensor;
a step of determining areas of the image sensor which regarded as having a predetermined low-luminance-level in the histogram; and
a step of controlling a light emission of an illumination device based on a luminance signal excluding luminance signals of areas of the image sensor which are determined as to have the predetermined low-luminance-level by said luminance distribution determination step, and whose proportion to overall frame exceeds a reference value.

8. The method according to claim 7, wherein the histogram is generated on the basis of signal levels of red signal, blue signal and green signal that are obtained by decomposing a sensed image signal.

9. A flash photographing method comprising:
a step of receiving object light;
a step of converting the object light into luminance signals of a plurality of areas of an image sensor;
a step of calculating a histogram of a luminance distribution on the basis of the converted luminance signals of the plurality of areas of the image sensor;
a step of determining areas of the image sensor which are regarded as having a predetermined low-luminance-level in the histogram; and
a step of controlling a light emission in a case of flash photographing operation based on a luminance signal excluding luminance signals of areas of the image sensor which are determined as to have the predetermined low-luminance-level by said luminance distribution determination step, and whose proportion to overall frame exceeds a reference value.

10. The method according to claim 9, wherein the histogram is generated on the basis of signal levels of red signal, blue signal and green signal that are obtained by decomposing a sensed image signal.

* * * * *